(12) United States Patent
Salumu

(10) Patent No.: US 12,712,890 B2
(45) Date of Patent: Aug. 18, 2026

(54) CYBERSECURITY TYPING AND INFERENCING

(71) Applicant: CrowdStrike, Inc., Sunnyvale, CA (US)

(72) Inventor: Providence Salumu, Ste-Marthe-sur-le-Lac (CA)

(73) Assignee: CrowdStrike, Inc., Sunnyvale, CA (US)

( * ) Notice: Subject to any disclaimer, the term of this patent is extended or adjusted under 35 U.S.C. 154(b) by 45 days.

(21) Appl. No.: 18/499,270

(22) Filed: Nov. 1, 2023

(65) Prior Publication Data

US 2025/0141889 A1 May 1, 2025

(51) Int. Cl.
*H04L 9/40* (2022.01)

(52) U.S. Cl.
CPC ................................ *H04L 63/1416* (2013.01)

(58) Field of Classification Search
CPC ............. H04L 63/1416; H04L 63/1425; H04L 63/1433; H04L 63/20; H04L 63/0236;
(Continued)

(56) References Cited

U.S. PATENT DOCUMENTS 6,487,666 B1 * 11/2002 Shanklin ................ G06F 21/55 709/224
7,930,256 B2 * 4/2011 Gonsalves ............... G06N 7/01 706/45

(Continued)

FOREIGN PATENT DOCUMENTS

CN 110365712 10/2019

OTHER PUBLICATIONS

Jones, Simon Peyton, et al. "Practical type inference for arbitrary-rank types," Journal of Functional Programming, Jul. 31, 2007.

(Continued)

*Primary Examiner* — Michael R Vaughan
*Assistant Examiner* — Saad Ahmad Abdullah
(74) *Attorney, Agent, or Firm* — Law Office of Scott P. Zimmerman, PLLC

(57) ABSTRACT

A cybersecurity event validation service provides a user-friendly scheme for detecting a cyberattack or threat. The cybersecurity event validation service accepts very simple, high-level, user-friendly descriptions of the cyberattack or threat. A user of the cybersecurity event validation service thus need not input detailed hardware/software events that specify the potential cyberattack or threat. The cybersecurity event validation service, instead, validates the user's very simple descriptions for correctness. If the user's very simple descriptions conform to basic rules or requirements, then the cybersecurity event validation service elegantly fills in the deep hardware and software details using context and inferences. The cybersecurity event validation service thus elaborates and enhances the user's very simple descriptions by supplying specific hardware/software details needed to detect the cyberattack or threat. The user thus need not be versed in the intricate programming/configurational details for defining the cyberattack or threat.

20 Claims, 21 Drawing Sheets

(58) Field of Classification Search
CPC ... H04L 63/0263; G06F 21/552; G06F 21/554
USPC ........................................................ 726/23
See application file for complete search history.

(56) References Cited

U.S. PATENT DOCUMENTS

| | | | | |
|---|---|---|---|---|
| 8,266,692 | B2 | 9/2012 | Wenzinger et al. | |
| 8,819,828 | B1 | 8/2014 | Umland et al. | |
| 8,881,278 | B2 | 11/2014 | Kaplan et al. | |
| 9,313,222 | B2 | 4/2016 | Huang et al. | |
| 9,442,917 | B2 * | 9/2016 | Dou | G06F 40/232 |
| 9,934,380 | B2 | 4/2018 | Dalcher et al. | |
| 10,375,572 | B2 | 8/2019 | Achim et al. | |
| 10,944,766 | B2 | 3/2021 | Mishra et al. | |
| 11,106,784 | B2 | 8/2021 | Rosendahl et al. | |
| 11,115,378 | B2 * | 9/2021 | Hoewisch | H04W 4/24 |
| 11,133,999 | B1 * | 9/2021 | Brosnan | H04L 47/36 |
| 11,722,515 | B1 | 8/2023 | Joyce et al. | |
| 11,855,869 | B2 * | 12/2023 | Brosnan | G06F 9/455 |
| 2014/0052849 | A1 * | 2/2014 | Sabin | H04L 43/10 709/224 |
| 2020/0074078 | A1 | 3/2020 | Saxe et al. | |
| 2021/0097172 | A1 * | 4/2021 | Colquhoun | G06F 21/57 |
| 2021/0165879 | A1 | 6/2021 | Duo et al. | |
| 2024/0111809 | A1 * | 4/2024 | Eggleton | G06F 16/9024 |

OTHER PUBLICATIONS

Pierce BC, "Types and Programming Languages," The MIT Press, Cambridge (Massachusetts), London (England), 2002.
European Search Report mailed Feb. 7, 2025 for European Patent Application No. 24207772.5 , 34 pages.
Applicant's Response to the Search Opinion submitted Nov. 6, 2025 for European Patent Application No. 24207772.5, 17 pages.

* cited by examiner

Figure 1:
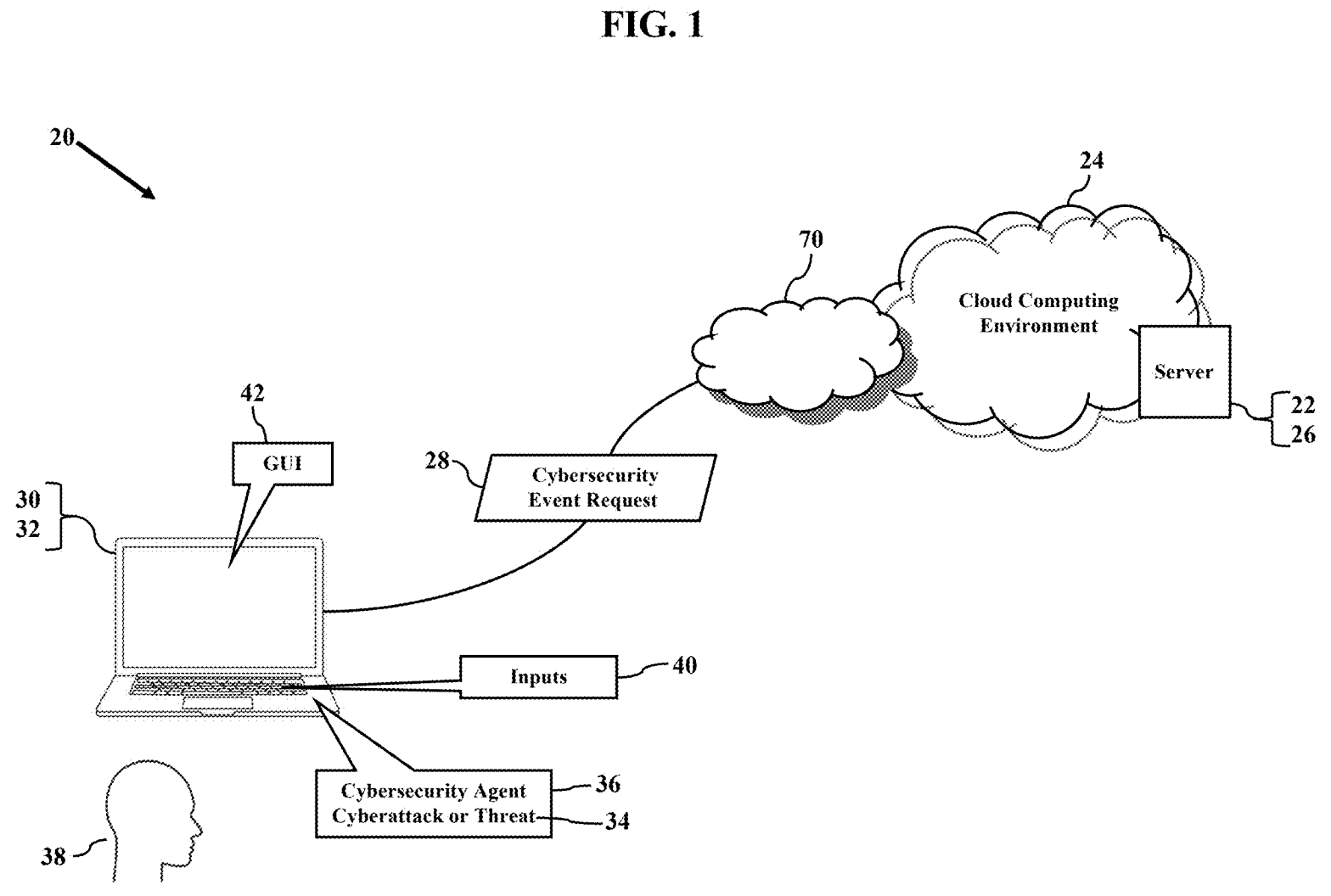

Server 22
26

Cloud Computing Environment

24

70

Cybersecurity Event Request

28

Inputs

40

Cybersecurity Agent
Cyberattack or Threat 36
34

GUI

Figure 2:
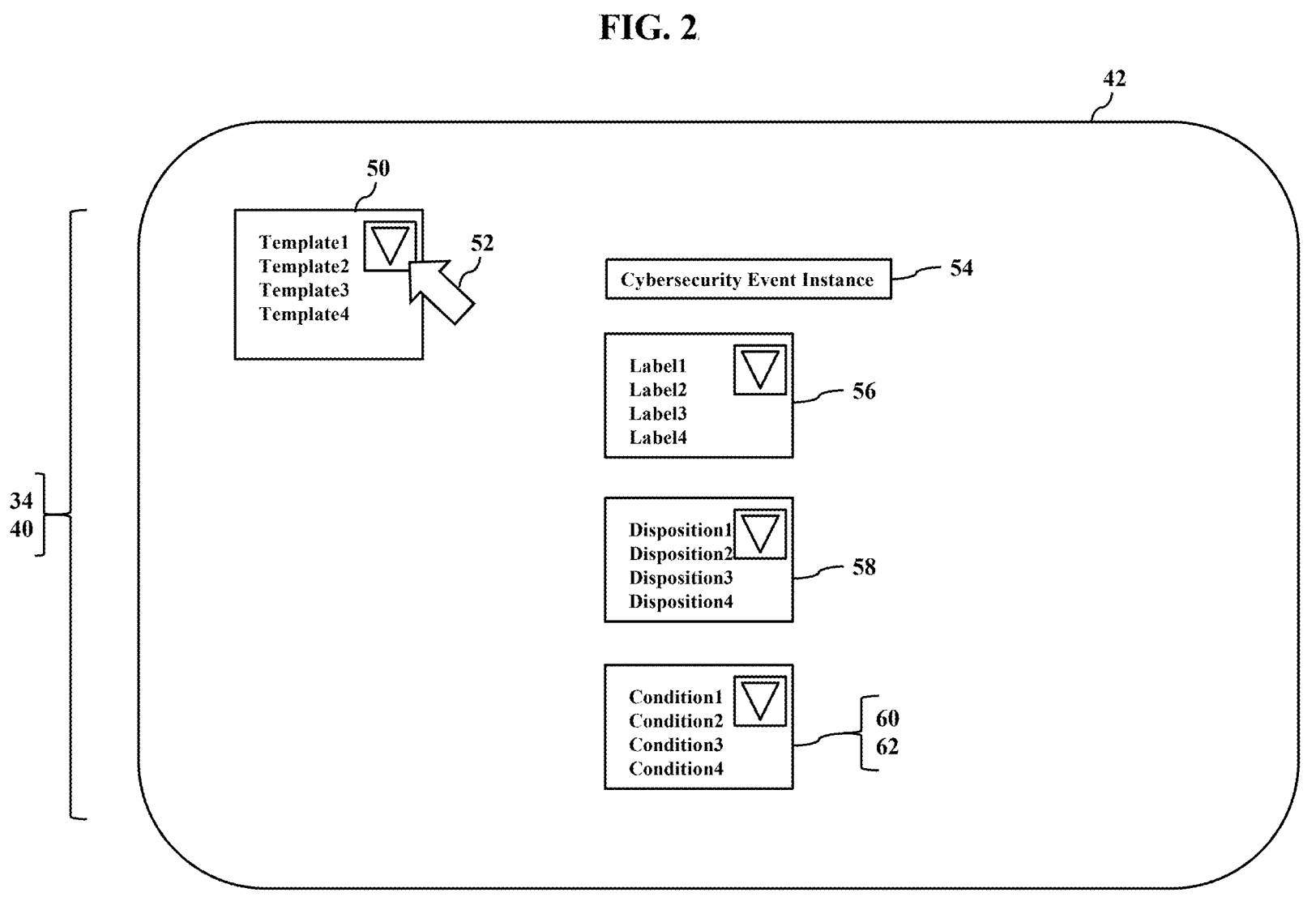

Template1
Template2
Template3
Template4

52

54

Cybersecurity Event Instance

56

Label1
Label2
Label3
Label4

58

Disposition1
Disposition2
Disposition3
Disposition4

60
62

Condition1
Condition2
Condition3
Condition4

Figure 3:
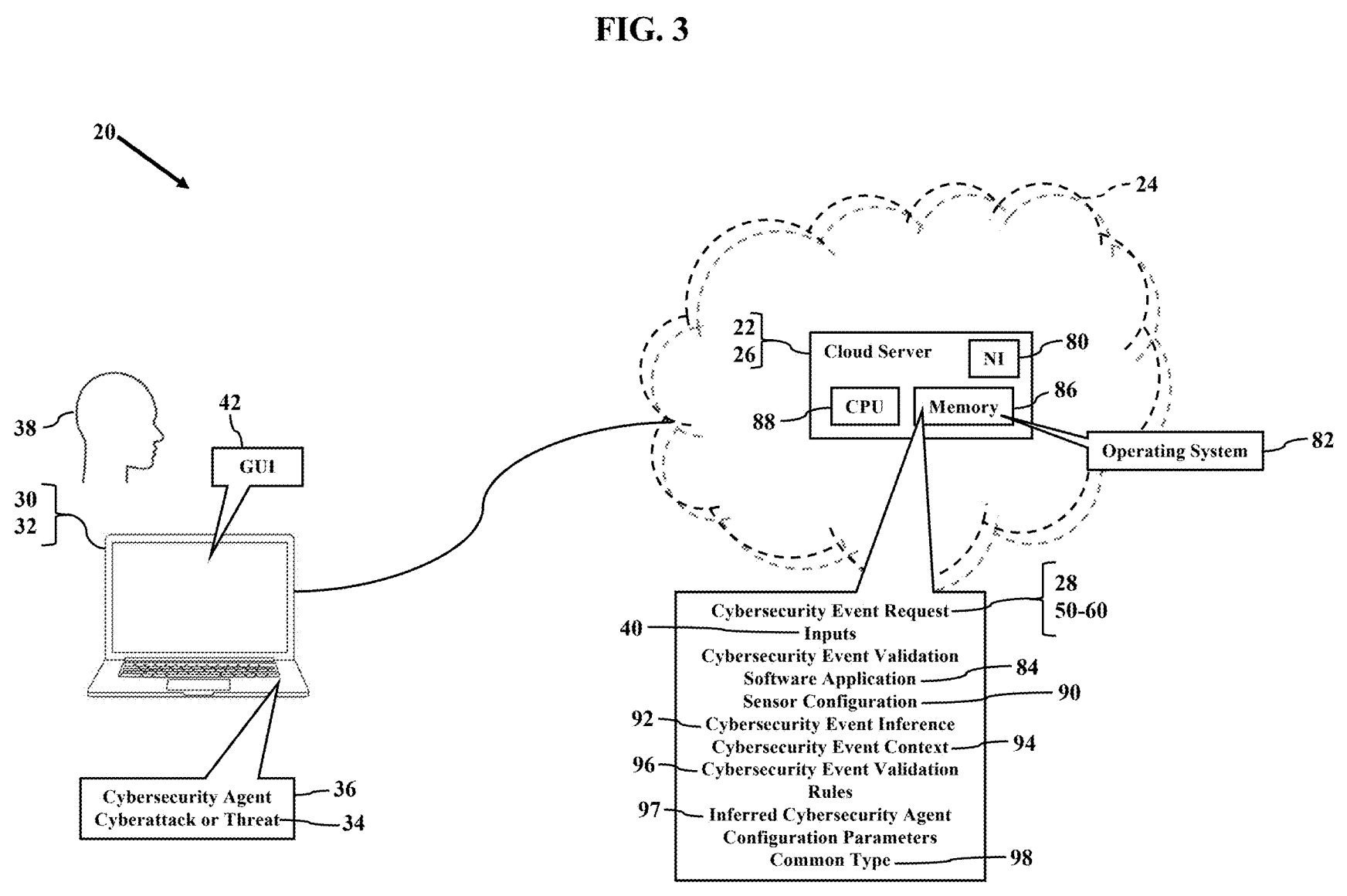

20
24
82
Operating System
80
86
NI
Memory
Cloud Server
CPU
22
26
88
28
50-60
84
90
94
98
Cybersecurity Event Request
Inputs
Cybersecurity Event Validation
Software Application
Sensor Configuration
Cybersecurity Event Inference
Cybersecurity Event Context
Cybersecurity Event Validation
Rules
Inferred Cybersecurity Agent
Configuration Parameters
Common Type
40
92
96
97
42
GUI
36
34
Cybersecurity Agent
Cyberattack or Threat
38
30
32

Figure 4:
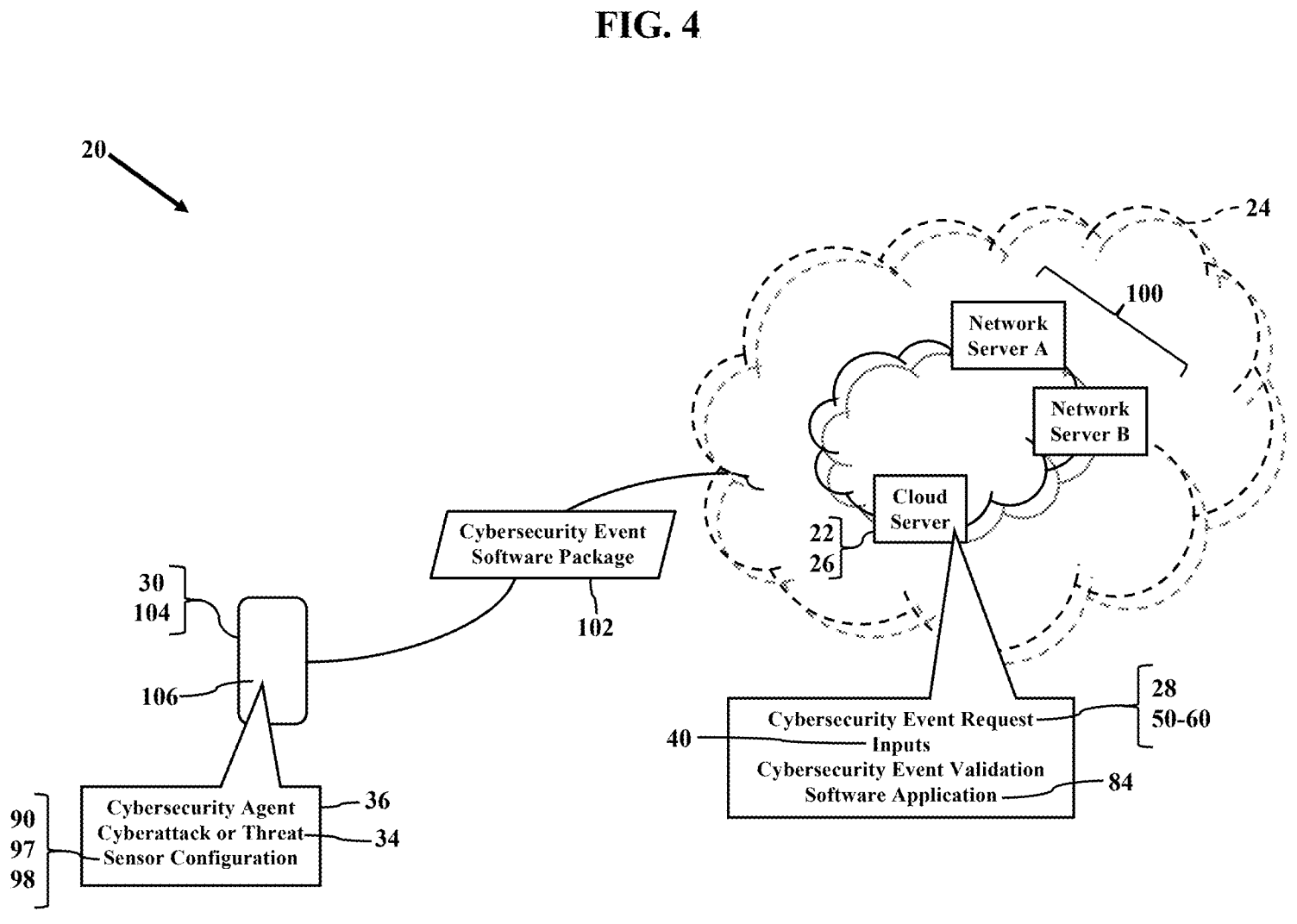

Network Server A

Network Server B

Cloud Server 22
26

28
50-60

Cybersecurity Event Request Inputs

Cybersecurity Event Validation Software Application

84

40

Cybersecurity Event Software Package

102

30
104

106

Cybersecurity Agent
Cyberattack or Threat
Sensor Configuration

36

34

90
97
98

20
Cloud Computing Environment
24
Cloud Server
22
26
84
Cybersecurity Event Validation Software Application
90 & 102
Cybersecurity Event Software Package
Cybersecurity Event Request
28
Inputs
40
Medical Monitor
30
110
GUI
42
Cybersecurity Agent Cyberattack or Threat
36
34

FIG. 6

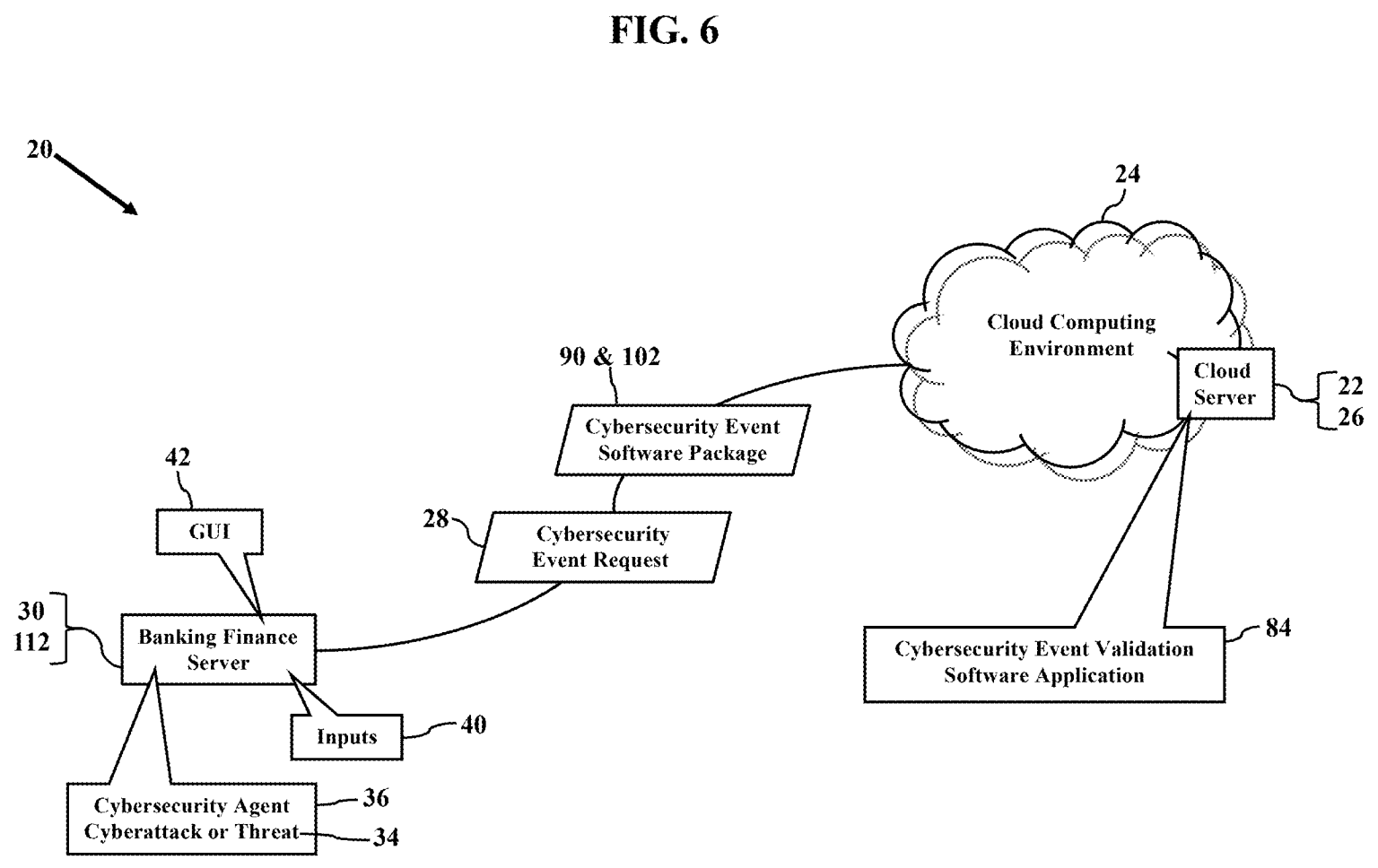

20
Cloud Computing Environment
24
Cloud Server
22
26
Cybersecurity Event Validation Software Application
84
Cybersecurity Event Software Package
90 & 102
Cybersecurity Event Request
28
Banking Finance Server
30
112
GUI
42
Inputs
40
Cybersecurity Agent
36
Cyberattack or Threat
34

Figure 7:
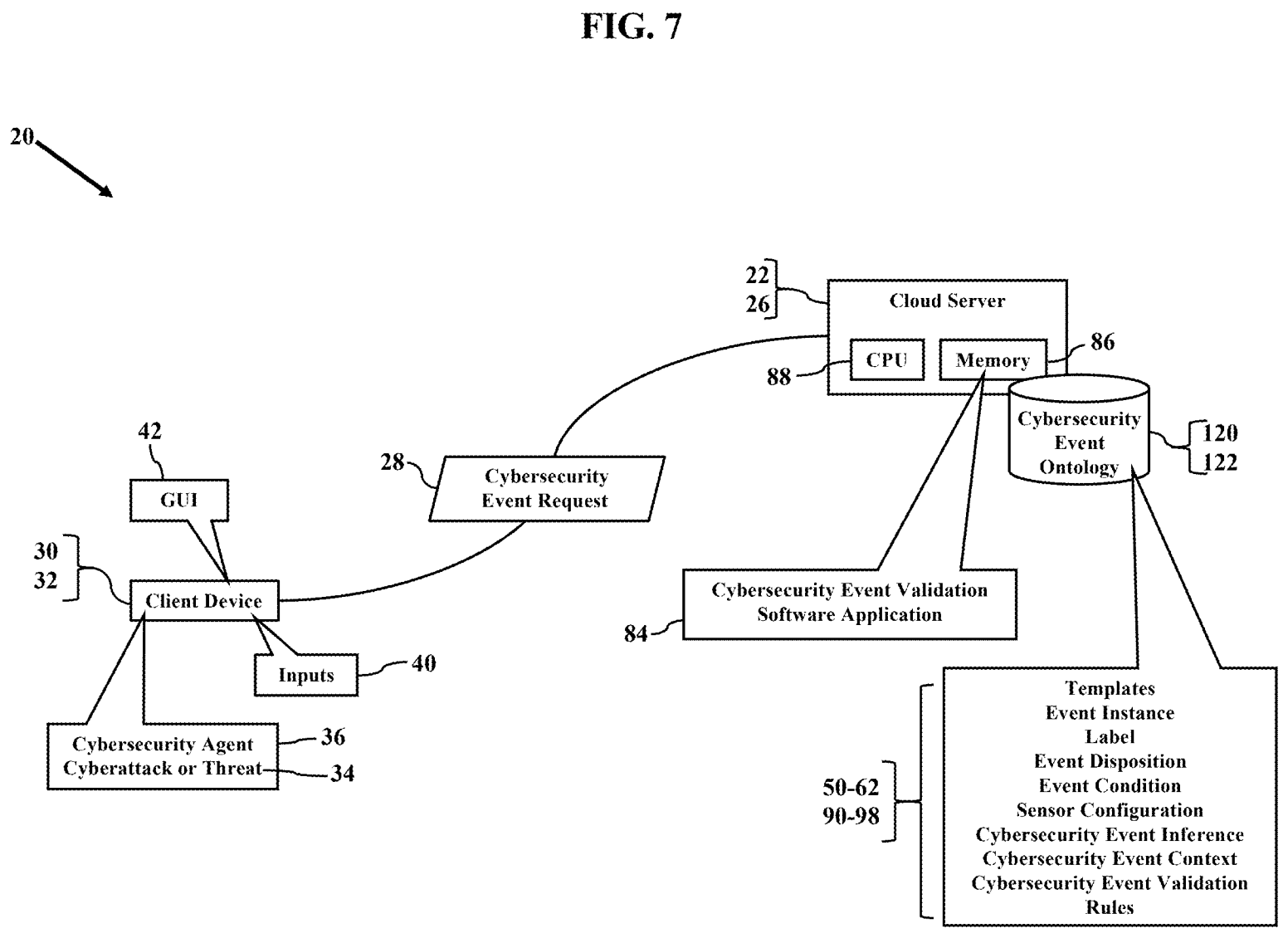

Cloud Server
CPU
Memory
22
26
86
88

Cybersecurity Event Ontology
120
122

Templates
Event Instance
Label
Event Disposition
Event Condition
Sensor Configuration
Cybersecurity Event Inference
Cybersecurity Event Context
Cybersecurity Event Validation Rules
50-62
90-98

Cybersecurity Event Validation Software Application
84

Cybersecurity Event Request
28

Client Device
30
32
GUI
42
Inputs
40
Cybersecurity Agent
Cyberattack or Threat
36
34

Figure 8:
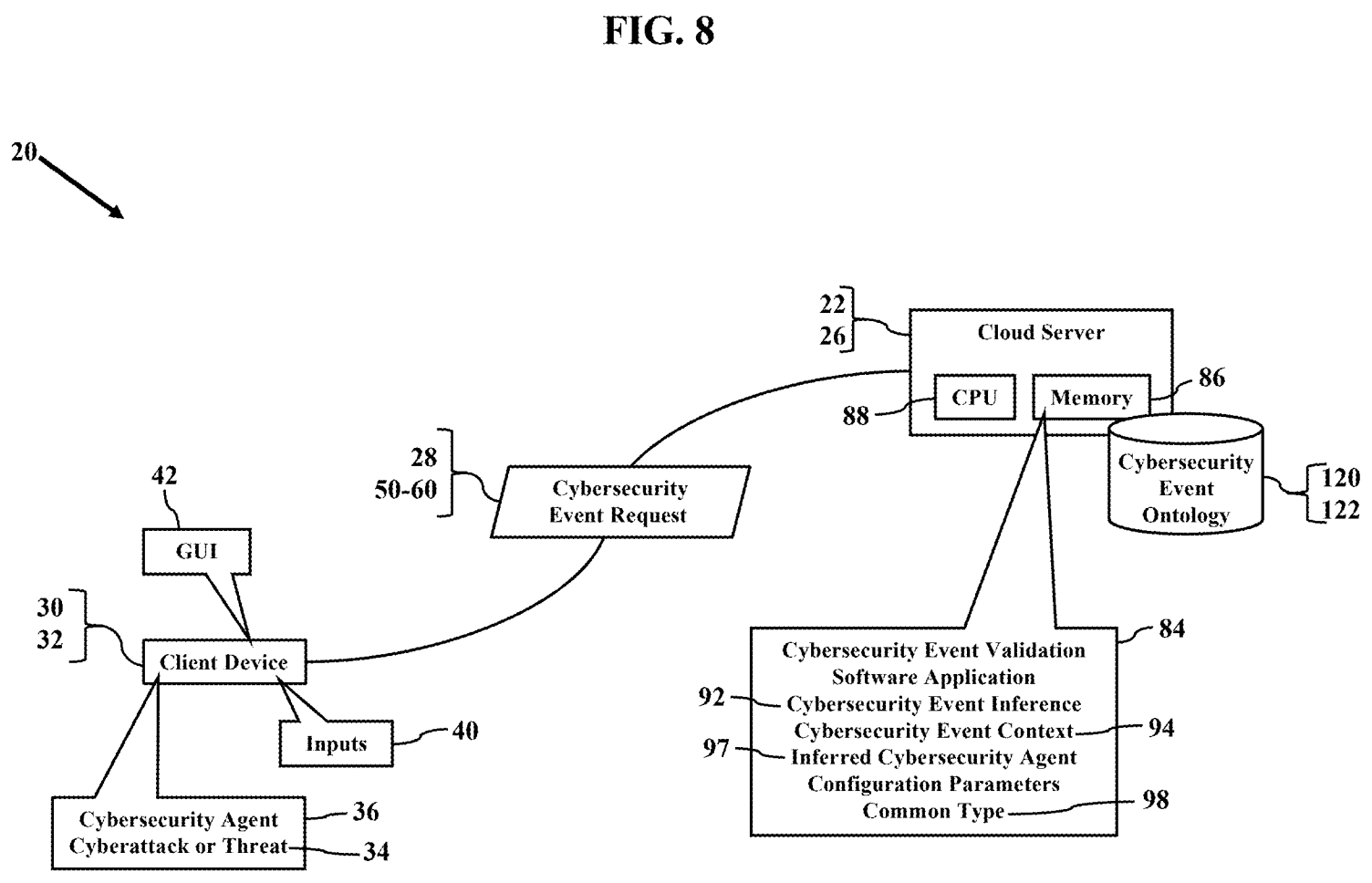

Cloud Server
CPU
Memory
22
26
86
88
Cybersecurity Event Ontology
120
122
84
Cybersecurity Event Validation Software Application
Cybersecurity Event Inference
Cybersecurity Event Context
Inferred Cybersecurity Agent
Configuration Parameters
Common Type
92
94
97
98
Cybersecurity Event Request
28
50-60
Client Device
30
32
GUI
42
Inputs
40
Cybersecurity Agent
Cyberattack or Threat
36
34

Figure 9:
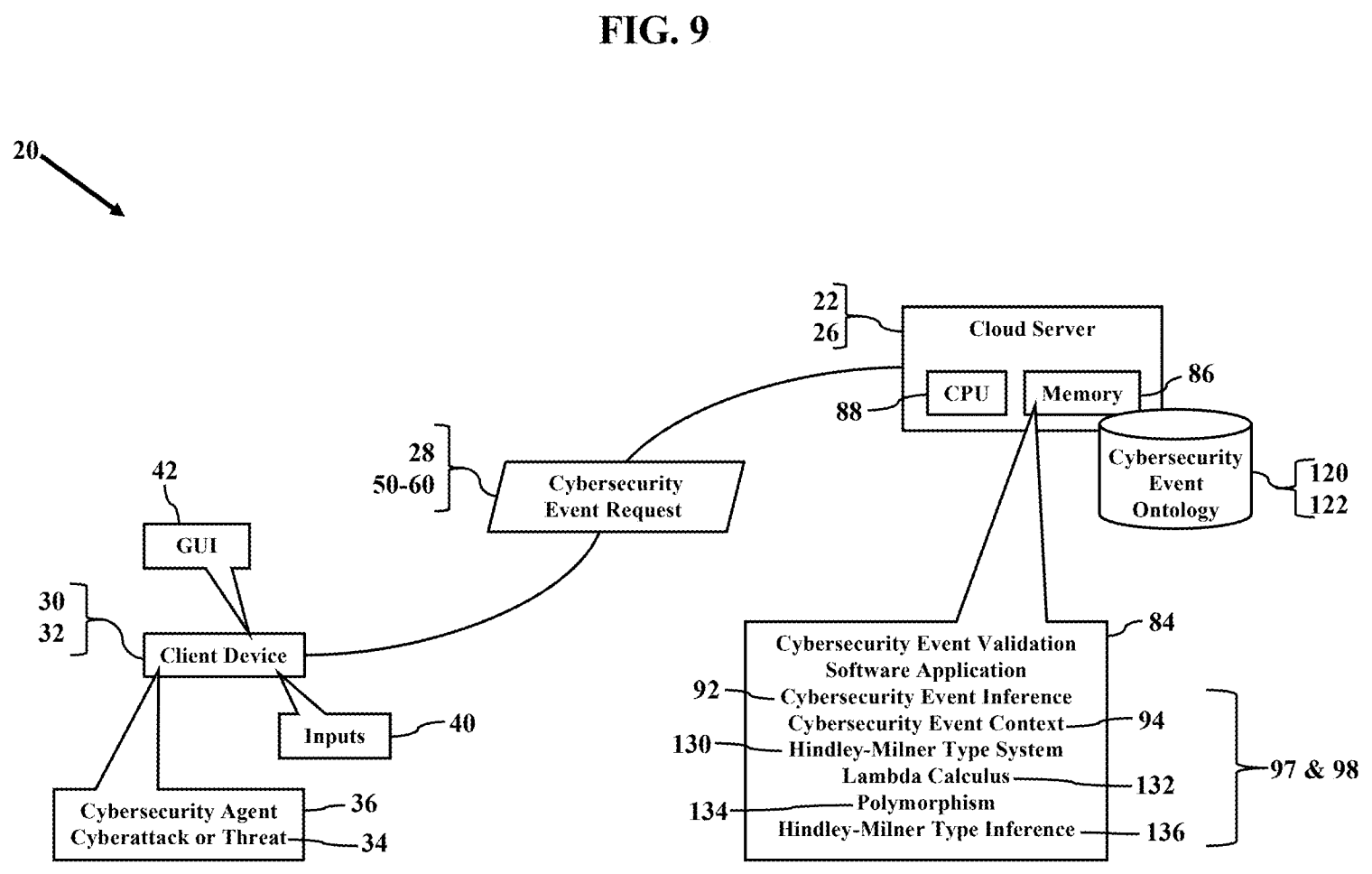

Cloud Server
CPU
Memory
22
26
86
88
Cybersecurity Event Ontology
120
122
84
Cybersecurity Event Validation Software Application
Cybersecurity Event Inference
Cybersecurity Event Context
Hindley-Milner Type System
Lambda Calculus
Polymorphism
Hindley-Milner Type Inference
92
94
130
132
134
136
97 & 98
Cybersecurity Event Request
28
50-60
Client Device
30
32
GUI
42
Inputs
40
Cybersecurity Agent
Cyberattack or Threat
36
34

28
Cybersecurity Event Request
42
Graphical User Interface
Rules
Action
ui_a
matches
spectre.*
ui_b
equals
150
ui_c
greater
150
ui_c
lesser
170
Armageddon Detected
20 & 40
140
50-60

FIG. 11
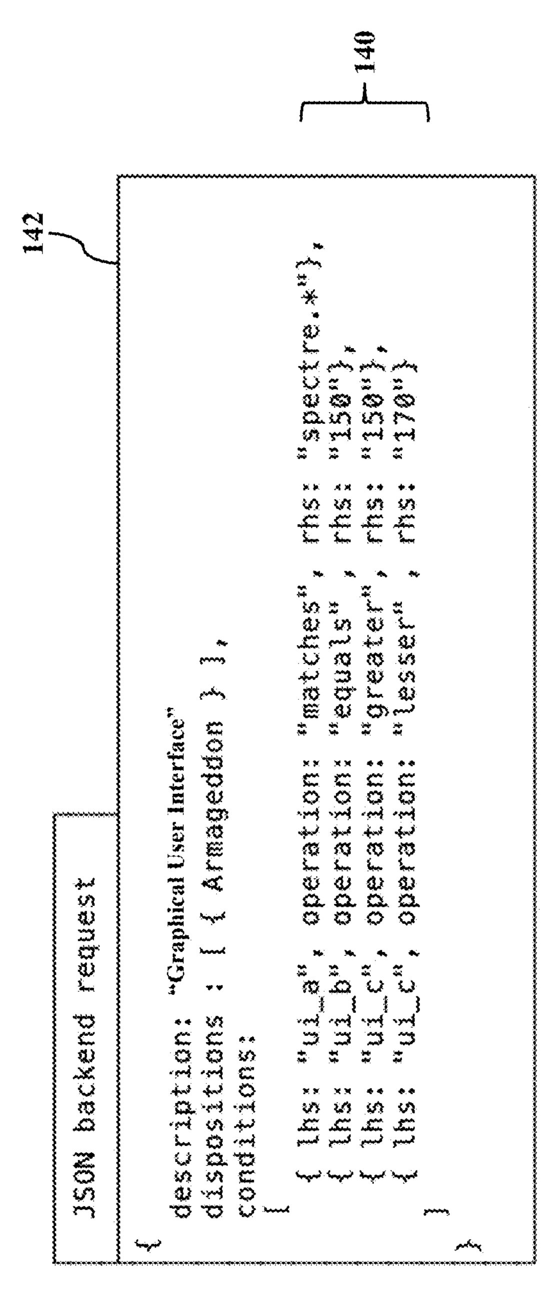
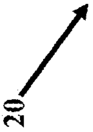

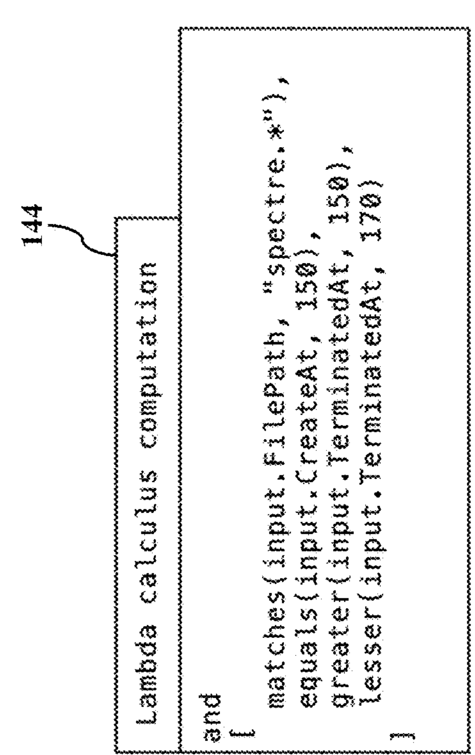
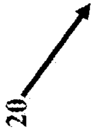
FIG. 12

Hindley Milner Type Elaboration (inferrence)

```
(and :: [bool] -> bool)
([
  (matches :: [char] -> regex -> bool)(input.FilePath :: [char], "spectre.*" :: regex),
  (equals  :: int32 -> int32 -> bool)(input.CreateAt :: int32, 150 :: int32) :: bool,
  (greater :: int64 -> int64 -> bool)(input.TerminatedAt :: int64, 150 :: int64) :: bool,
  (lesser  :: int64 -> int64 -> bool)(input.TerminatedAt :: int64, 170 :: int64) :: bool
] :: [bool]) :: bool
```

FIG. 14
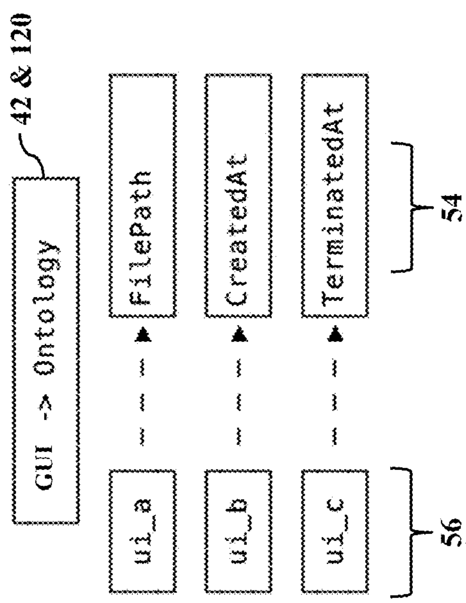

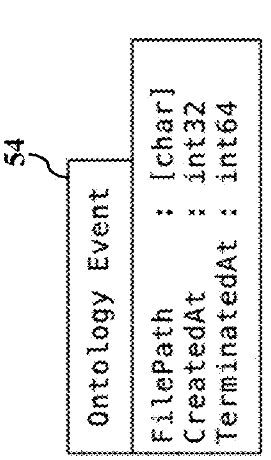
FIG. 15

20
Cybersecurity Event Ontology
120
54
Event
{FilePath
, CreatedAt
, TerminatedAt
}
28
Cybersecurity Event Request
Transform
142
JSON Request
Convert
Lambda Calculus Expression
144
HM Type Elaboration
Typed Lambda Calculus Expression
150
Codegen: normalization by evaluation
90 & 102
Generate Sensor Configuration ("Burninator Assembly")

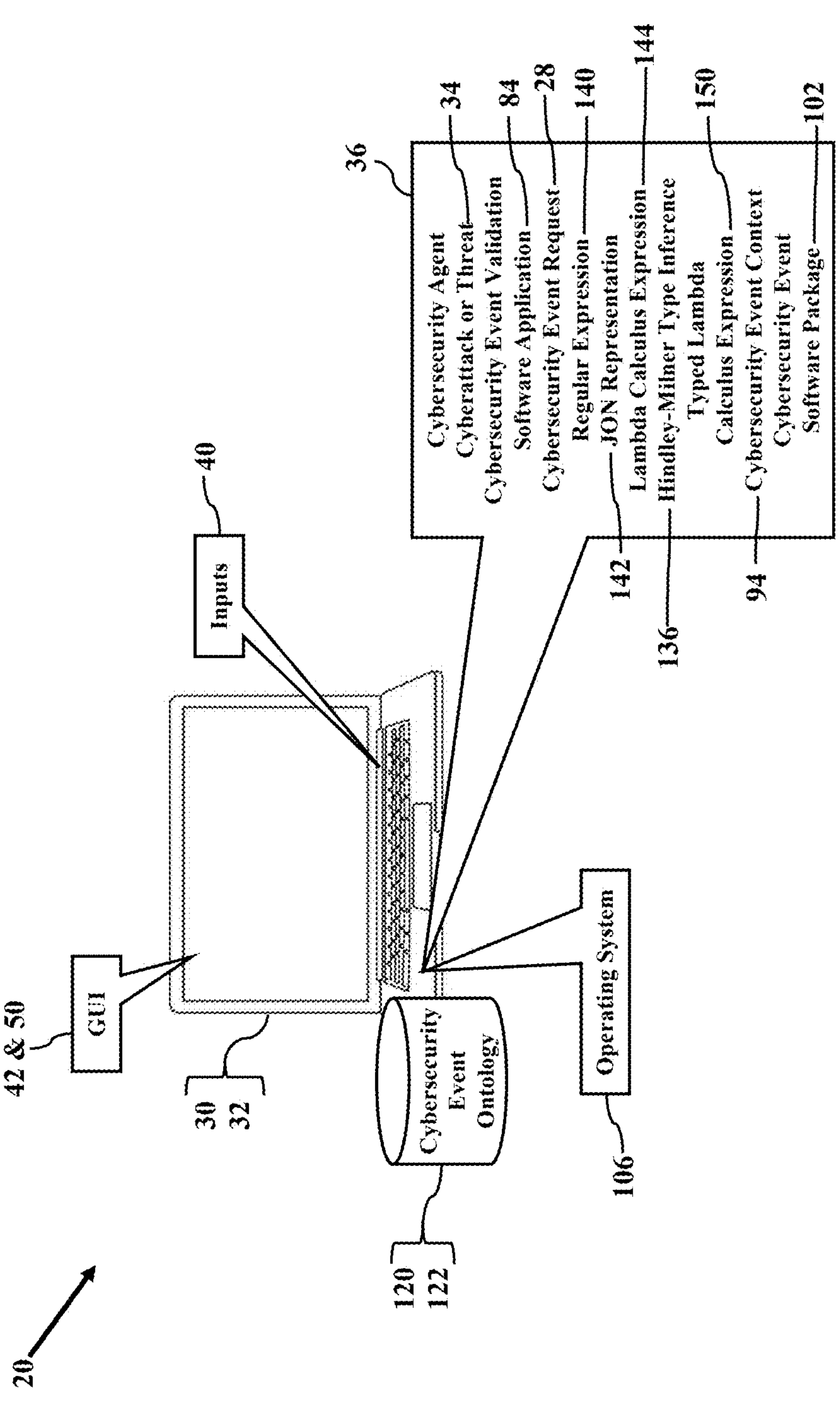
FIG. 17
20
42 & 50
GUI
30
32
Inputs
40
Cybersecurity Event Ontology
120
122
Operating System
106
36
Cybersecurity Agent
Cyberattack or Threat
34
Cybersecurity Event Validation
84
Software Application
28
Cybersecurity Event Request
140
Regular Expression
JON Representation
142
Lambda Calculus Expression
144
Hindley-Milner Type Inference
136
Typed Lambda
Calculus Expression
150
Cybersecurity Event Context
94
Cybersecurity Event
Software Package
102

Figure 21:
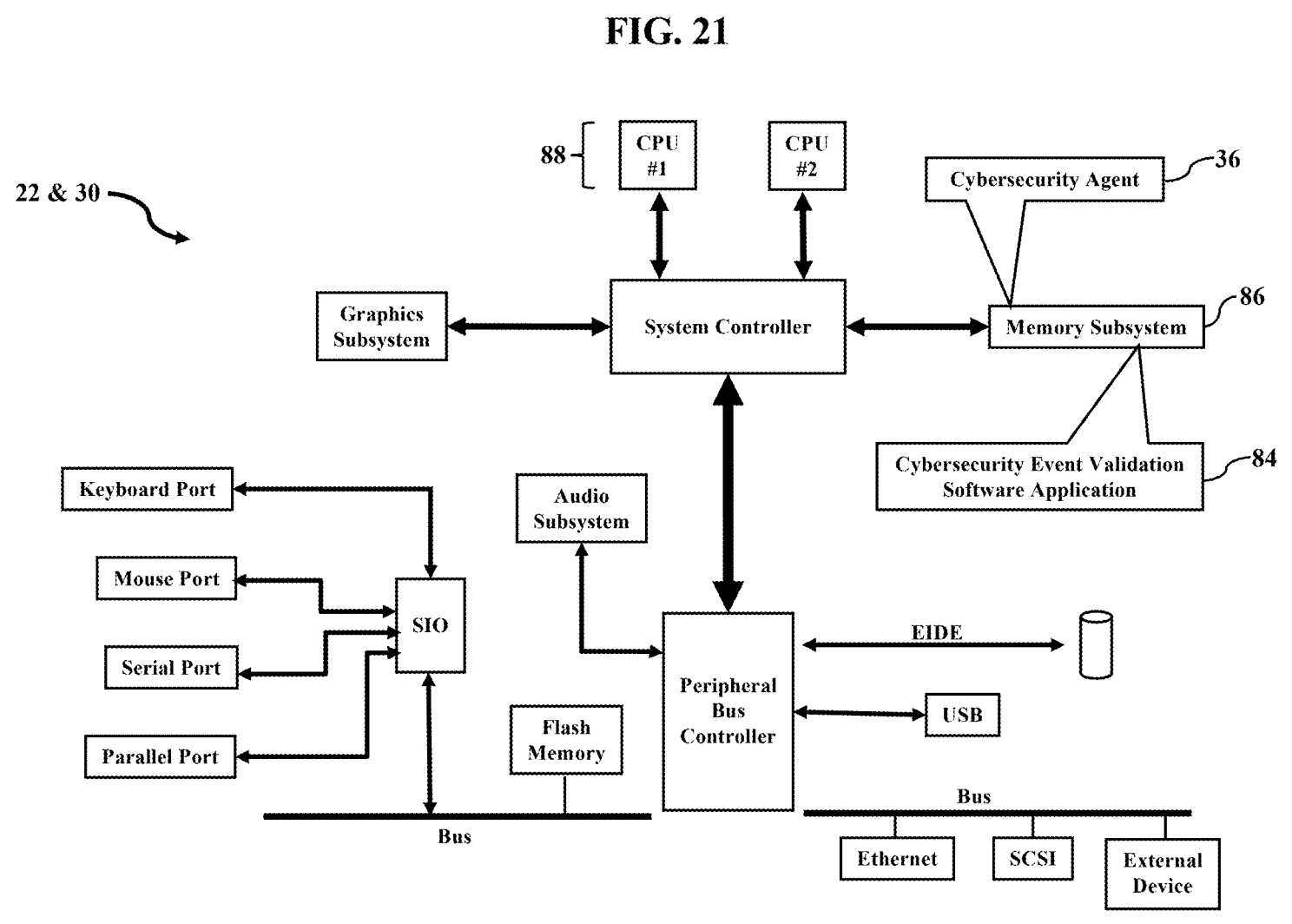

CPU #1

CPU #2

System Controller

Graphics Subsystem

36

Cybersecurity Agent

86

Memory Subsystem

84

Cybersecurity Event Validation Software Application

Peripheral Bus Controller

Audio Subsystem

EIDE

USB

Bus

Ethernet

SCSI

External Device

Flash Memory

Bus

SIO

Keyboard Port

Mouse Port

Serial Port

Parallel Port

CYBERSECURITY TYPING AND INFERENCING

BACKGROUND

The subject matter described herein generally relates to computers and, more particularly, the subject matter relates to dynamic computer malware detection.

Cybersecurity is exceptionally difficult. Nearly every day we read of another virus, hack, or malware. In order to thwart or stop a cyberattack, cybersecurity experts must carefully define exactly the computer conditions or circumstances that indicate the potential cyberattack. The cybersecurity experts, in other words, must carefully specify deep hardware/software details (perhaps even bits and bytes of data) that indicate the potential cyberattack. The problem, though, is that these deep hardware/software details are very difficult to correctly specify. Any error in these deep hardware/software details can cause a computer to misbehave. Indeed, even a tiny error may cause the computer to crash, perhaps causing great consequences for networks and for operations. Conventional cybersecurity schemes that require these deep hardware/software details have thus proven too difficult and too risky for wider adoption.

SUMMARY

A cybersecurity event validation service provides a user-friendly scheme for detecting a cyberattack. The cybersecurity event validation service accepts simple, high-level, user-friendly descriptions of the cyberattack. A user of the cybersecurity event validation service thus need not input detailed hardware/software events that specify the potential cyberattack. The cybersecurity event validation service, instead, validates the user's descriptions for correctness. If the user's descriptions conform to basic rules or requirements, then the cybersecurity event validation service elegantly fills in the deep hardware and software details using context and inferences. The cybersecurity event validation service thus elaborates and enhances the user's descriptions, which may be very simple, by supplying specific hardware/software details needed to detect the cyberattack. The user thus need not be versed in the intricate programming/configurational details for defining the cyberattack.

BRIEF DESCRIPTION OF THE SEVERAL VIEWS OF THE DRAWINGS

The features, aspects, and advantages of the cybersecurity event validation service are understood when the following Detailed Description is read with reference to the accompanying drawings, wherein:

FIGS. 1-3 illustrate some examples of the cybersecurity event validation service;

FIG. 4 illustrates some examples of a sensor configuration;

FIGS. 5-6 illustrate examples of improved computer functioning;

FIGS. 7-8 illustrate some examples of a cybersecurity event ontology;

FIGS. 9-15 illustrate more examples of the cybersecurity event validation service;

FIG. 17 illustrates examples of local execution;

FIG. 21 illustrates a more detailed example of the operating environment.

DETAILED DESCRIPTION

Figure 5:
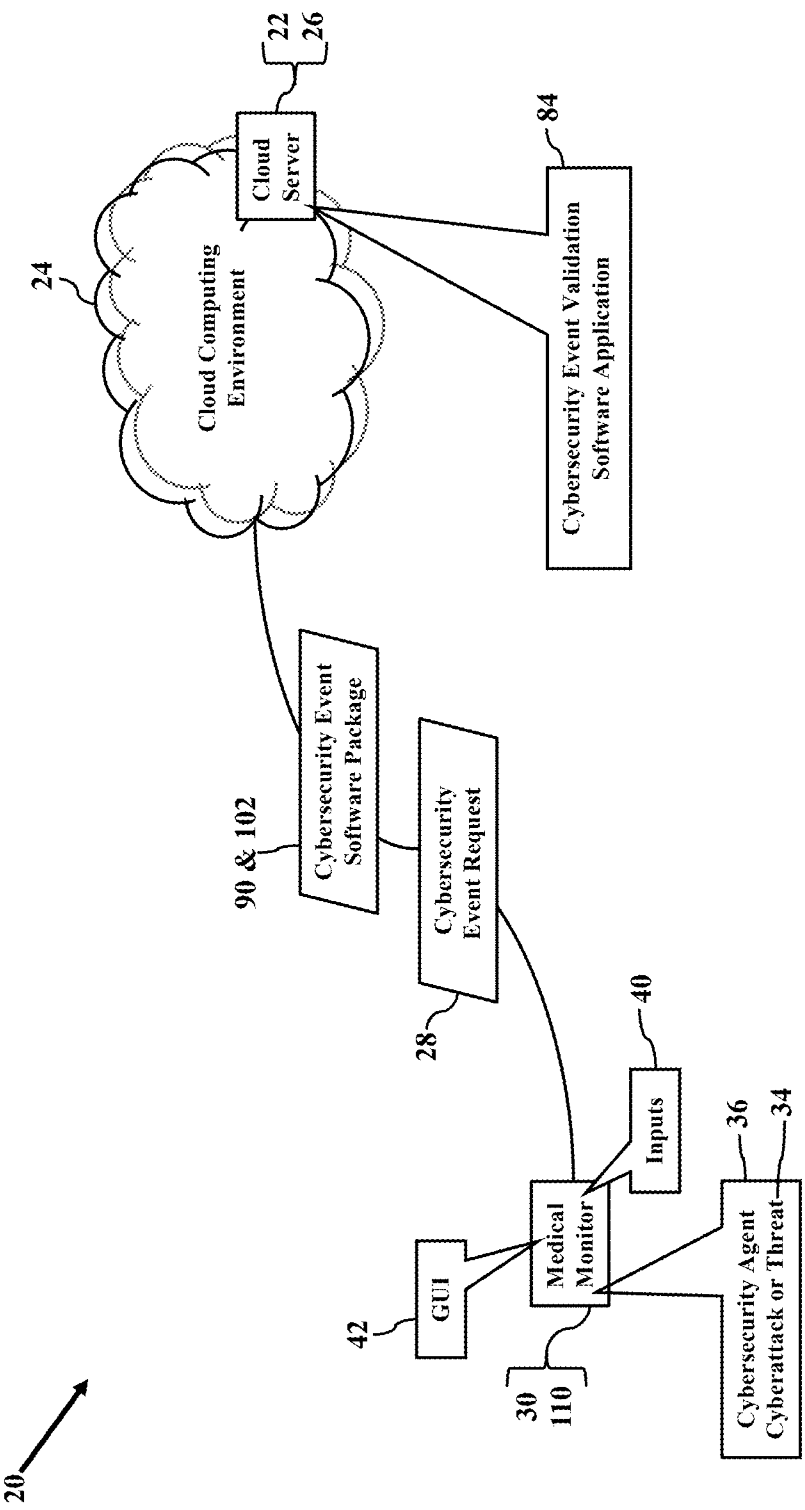

Some examples of this disclosure relate to cybersecurity configuration and detection. A cybersecurity event validation service provides a scheme for detecting a cyberattack. A user of a computer makes inputs (e.g., very simple inputs) that generally describe the cyberattack. The user's inputs, for example, may be entered into a graphical user interface that is displayed by the computer. The user's inputs, though, need only be high-level, user-friendly descriptions of the cyberattack. The user's inputs, in other words, need not specify the deep hardware/software details that indicate the potential cyberattack. The cybersecurity event validation service, instead, may check the user's inputs for correctness. If the user's inputs conform to basic rules or requirements, then the cybersecurity event validation service elegantly fills in the deep hardware and software details. The cybersecurity event validation service inspects the user's inputs and, using very sophisticated techniques, determines a context and generates inferences. The cybersecurity event validation service may then "fill in" the deep hardware and software details using the context and the inferences. The cybersecurity event validation service thus elaborates and enhances the user's simple inputs by supplying the specific hardware/software details needed to detect the cyberattack. The user thus need not be versed in the intricate programming/configurational details for defining the cyberattack. The user only needs a basic or even a beginner/rudimentary knowledge of cybersecurity techniques.

The cybersecurity event validation service improves computer functioning. The user's inputs need only be high-level, user-friendly descriptions of the cyberattack. Because the cybersecurity event validation service is designed for very easy use (perhaps even by laypersons largely unfamiliar with cybersecurity), the user's inputs are simple and lack detail. Indeed, if the user's inputs contain perhaps even a small error, the user's inputs may cause a computer to crash or fail. The cybersecurity event validation service, instead, improves the functioning of the computer by ensuring that the user's simple inputs are correctly defined and validated, thus greatly reducing the risk of computer error. Moreover, because the cybersecurity event validation service fills in the deep hardware and software details, the cybersecurity event validation service ensures that the computer is correctly configured to detect the cyberattack. Moreover, because the cybersecurity event validation service ensures that the user's inputs are correctly defined and validated, local and cloud resources are not wasted on mis-defined user inputs. For instance, processor and memory cycles are conserved, packet networking communications are reduced, and electrical power is saved. The cybersecurity event validation service, instead, pre-validates the user's inputs to improve the functioning of computers and networks.

The cybersecurity event validation service will now be described more fully hereinafter with reference to the accompanying drawings. The cybersecurity event validation service, however, may be embodied and implemented in many different forms and should not be construed as limited to the examples set forth herein. These examples are provided so that this disclosure will be thorough and complete and fully convey the cybersecurity event validation service to those of ordinary skill in the art. Moreover, all the examples of the cybersecurity event validation service are intended to encompass both structural and functional equivalents thereof. Additionally, it is intended that such equivalents include both currently known equivalents as well as equivalents developed in the future (i.e., any elements developed that perform the same function, regardless of structure).

FIGS. 1-3 illustrate some examples of a cybersecurity event validation service 20. A computer system 22 operates in a cloud computing environment 24. FIG. 1 illustrates the computer 22 as a cloud server 26. The computer 22, though, may be any processor-controlled device (as later paragraphs will explain). In this example, the cloud server 26 is programmed to assess a cybersecurity event request 28 sent by a client device 30. FIG. 1 illustrates the client device 30 as a laptop computer 32, but, again, the client device 30 may be any processor-controlled device. The cybersecurity event request 28 broadly or generally describes a cyberattack or threat 34 to be detected by a cybersecurity agent 36. The cybersecurity agent 36 is a software product or application that detects or senses viruses, malware, and other suspicious computer behaviors that may indicate the cyberattack or threat 34. A user 38 of the laptop computer 32, for example, may make tactile inputs 40 (e.g., keyboard, mouse, capacitive, etc.) associated with a graphical user interface (or "GUI") 42 displayed by the laptop computer 32. The inputs 40 outline or broadly describe any suspicious behavior, unusual login/location, or other potential cyberattacks or threats 34 that should be detected by the cybersecurity agent 36. The user 38 may thus interact with the graphical user interface 42 and custom define any suspicious activities to be detected by the cybersecurity agent 36.

As FIG. 2 illustrates, the graphical user interface 42 is designed for very simple use. The graphical user interface 42 only requires high-level, user-friendly inputs 40. The user's inputs 50 need only simply describe the cyberattack or threat 34 to be detected by the cybersecurity agent 36 (illustrated in FIG. 1). The graphical user interface 42, for example, may include a mechanism for selecting a cybersecurity event template 50. The cybersecurity event template 50 may correspond to the cyberattack or threat 34 that should be detected by the cybersecurity agent 36. The cybersecurity event template 50 may thus visually present pre-defined data fields, selections, and other requirements for specifying the corresponding cyberattack or threat 34. Indeed, because there are likely many different cyberattacks or threats 34, the graphical user interface 42 may present a drop-down menu of different cybersecurity event templates 50 from which the user 38 (illustrated in FIG. 1) may choose. The user 38 tactilely moves a graphical cursor 52, selects the drop-down menu, and then selects the desired cybersecurity event template 50.

The user 38 may then populate predefined informational content. Once the user 38 selects her/his desired cybersecurity event template 50, the graphical user interface 42 displays the corresponding informational content required by the cybersecurity event template 50. Because the cybersecurity event template 50 is designed for very simple use, the cybersecurity event template 50 may only require minimum or basic information. The graphical user interface 42, for example, may present a first data field for inputting a cybersecurity event instance 54. The cybersecurity event instance 54 may be a textual, alphanumeric description of a hardware or software process event, communication, activity, behavior, data value, pattern, login/location, or other electronic content description of the potential cyberattack or threat 34. The user tactilely moves the graphical cursor 52, selects the data field, and types/enters the targeted cybersecurity event instance 54. The graphical user interface 42 may also include a second data field for inputting a data label 56 describing the cybersecurity event instance 54. The data label 56 may be a descriptive tag or metadata that further explains the cybersecurity event instance 54. While the data label 56 may have any presentation, FIG. 2 illustrates another drop-down menu of different, pre-determined data labels 56 for describing the cybersecurity event instance 54. The user tactilely moves the graphical cursor 52, selects the drop-down menu, and then selects the desired data label 56. The graphical user interface 42 may also include a third data field for inputting a cybersecurity event disposition 58. The cybersecurity event disposition 58 may be an output, event, communication, activity, or other action that the cybersecurity agent 36 takes or implements after detection of the cybersecurity event instance 54. The user 38 may tactilely move the graphical cursor 52, select the third data field, and type/enter text representing the cybersecurity event disposition 58. The graphical user interface 42 may also include yet another drop-down menu of different, pre-determined cybersecurity event dispositions 58, thus allowing the user 38 to tactilely select the desired cybersecurity event disposition 58.

As FIG. 2 also illustrates, the user 38 may define more sophisticated detections. If the user 38 desires, the graphical user interface 42 may permit selection of a cybersecurity event condition 60. The cybersecurity event condition 60 may be a logical operator 62 between two (2) or more argument or terms. Some common cybersecurity event conditions 60 may include and, or, equal, end, negate, set contains, and any other logical operator 62. The graphical user interface 42 may also include still another drop-down menu of different, pre-determined cybersecurity event conditions 60, thus allowing the user 38 to tactilely select the desired logical operator 62. So, by using one or more of the cybersecurity event conditions 60, the user 38 may simply describe more advanced descriptions of the suspicious activities to be detected by the cybersecurity agent 36.

Returning to FIG. 1, the user's inputs 40 are uploaded to the cloud computing environment 24. When the user 38 completes the inputs 40, the cybersecurity agent 36 may include computer software that packages/formats the inputs 40 as the cybersecurity event request 28. The cybersecurity agent 36 may then send the cybersecurity event request 28 via an access communications network 70 to the cloud computing environment 24. When the cloud computing environment 24 receives the cybersecurity event request 28, network members (not shown for simplicity) affiliated with the cloud computing environment 24 may then forward or route the cybersecurity event request 28 to the network address (e.g., Internet protocol address) associated with the cloud server 26.

FIG. 3 further illustrates the cybersecurity event validation service 20. The cloud server 26 has a network interface 80 to the cloud computing environment 24, thus allowing the cloud server 26 to establish network communications with local and remote computers (such as the user's laptop computer 32). When the cloud server 26 receives the cybersecurity event request 28, the cloud server 26 is programmed to provide the cybersecurity event validation service 20 that assesses the cybersecurity event request 28. The cloud server 26 stores and executes an operating system 82. The cloud server 26 also stores a cybersecurity event validation software application 84 in a memory device 86. The cloud server 26 has a hardware processor 88 (illustrated as "CPU") that reads and executes the cybersecurity event validation software application 84. The cybersecurity event validation software application 84 has programming code or instructions that cause the hardware processor 88 to perform operations, such as determining if the user's inputs 40 (described by or contained within) the cybersecurity event request 28 are correct, proper, and/or valid. Again, because the graphical user interface 42 is designed for very easy use, the graphical user interface 42 only requires that the user 38 provide minimal or basic information. The user's inputs 40 may thus be merely high-level, user-friendly descriptions of the cyberattack or threat 34 that should be detected by the cybersecurity agent 36. The user 38, in other words, may merely compose conditional rules and output dispositions that lack many necessary details (as illustrated by FIG. 2). If any of the user's inputs 40 have an improper value, improper formatting, or other improper content, the cybersecurity agent 36 may be mis-configured and cause operational errors in the client device 30 (again illustrated as the laptop computer 32).

The cybersecurity event validation service 20 may thus evaluate the cybersecurity event request 28. The cybersecurity event validation software application 84 instructs or causes the cloud server 26 to function as a compiler frontend and/or a connection between the cybersecurity event request 28 and a resulting sensor configuration 90 implemented in the cybersecurity agent 36. Because the user's inputs 40 primarily consist of high-level, user-friendly descriptions, the user's inputs 40 often lack the necessary level of detail regarding the cybersecurity agent's data capabilities. The cybersecurity event validation service 20 may thus inspect the cybersecurity event request 28 and generate one or more cybersecurity event inferences 92. The cybersecurity event validation service 20, in other words, may read/obtain the user's inputs 40 (represented by the cybersecurity event request 28) and infer additional details that may be required to configure the cybersecurity agent 36. The cybersecurity event validation service 20, for example, may infer a cybersecurity event context 94 associated with the cybersecurity event request 28. The cybersecurity event context 94 describes the event circumstances associated with the cybersecurity event request 28, such as hardware, software, and/or operating system 82 events, behaviors, calls, and/or activities associated with the user's inputs 40. The cybersecurity event validation service 20 may additionally or alternatively check or compare the cybersecurity event request 28 against one or more cybersecurity event validation rules 96. The cybersecurity event validation rules 96 logically describe data requirements, data values, and/or bit/byte representations associated with the cybersecurity event template 50, the cybersecurity event instance 54, the data label 56, the cybersecurity event disposition 58, and/or the cybersecurity event condition 60. If the cybersecurity event request 28 equals, satisfies, or passes any or all of the cybersecurity event validation rules 96, then the cybersecurity event validation service 20 may approve, pass, validate, and/or authorize the cybersecurity event request 28. If, however, the cybersecurity event request 28 fails to equal, satisfy, or pass any or all of the cybersecurity event validation rules 96, then the cybersecurity event validation service 20 may disapprove, disallow, fail, and/or reject the cybersecurity event request 28.

The cybersecurity event validation service 20 may thus infer one or more cybersecurity agent configuration parameters 97. Again, because the graphical user interface 42 is designed for very easy use, the graphical user interface 42 does not require detailed event configuration information. The cybersecurity event request 28 may thus lack much information that is required to configured the cybersecurity agent 34. The sensor configuration 90, in other words, may require far more detailed information than is specified by the cybersecurity event request 28. However, by generating at least one of the cybersecurity event interference 92 or the cybersecurity event context 94, the cybersecurity event validation service 20 may infer one or more of the cybersecurity agent configuration parameters 97. Indeed, by analyzing the cybersecurity event request 28, the cybersecurity event validation service 20 may infer one or more common types 98 of data that further configure the cybersecurity agent 34. The cybersecurity event validation service 20 may thus performing elegant operations for inferring additional cybersecurity agent configuration parameters 97 unspecified by the cybersecurity event request 28. The inferred cybersecurity configuration parameters 97 and/or the common types 98 of data thus fill gaps or missing configurational details not specified by the user 38.

FIG. 4 illustrates some examples of the sensor configuration 90. If the cybersecurity event validation service 20 approves, authorizes, or validates the cybersecurity event request 28, then the cloud computing environment 24 may configure the cybersecurity agent 36. While any networked member 100 of the cloud computing environment 24 may configure the cybersecurity agent 36, FIG. 4, for simplicity, again illustrates the cloud server 26. When the cybersecurity event request 28 satisfies the cybersecurity event validation service 20, the cybersecurity event validation software application 84 may further instruct or cause the cloud server 26 to generate the sensor configuration 90 that detects the cyberattack or threat 34 specified by the cybersecurity event request 28. The cybersecurity event validation software application 84, in other words, may translate the cybersecurity event request 28 into software programming statements, instructions, and other code to be executed by the cybersecurity agent 36. The cybersecurity event validation software application 84 thus instructs the cloud server 26 to generate a cybersecurity event software package 102 representing the cybersecurity event request 28. The cloud computing network 24, the cloud server 26, and/or the cybersecurity event validation software application 84 may then establish communication with the cybersecurity agent 36 and download or send the cybersecurity event software package 102 to the network address (e.g., IP address) associated with the client device 30. Again, because the client device 30 may be any processor-controlled device, FIG. 4 illustrates a mobile smartphone 104. When the smartphone 104 receives the cybersecurity event software package 102, the smartphone 104 has a hardware processor that executes an operating system 106 stored in a memory device. The cybersecurity agent 36 cooperates with the operating system 106 to store and install the cybersecurity event software package 102, thus implementing the sensor configuration 90 reflecting the cybersecurity event request 28. The cybersecurity sensor configuration 90, in particular, may include the cybersecurity agent configuration parameters 97 and/or the common types 98 of data inferred based upon the cybersecurity event request 28. The cybersecurity agent 36 and/or the smartphone 104 is/are then ready to detect the cyberattack or threat 34 represented by the cybersecurity event request 28.

The sensor configuration 90 may be distributed to many different client devices 30. Once the cybersecurity event validation service 20 generates the cybersecurity sensor configuration 90, the cloud computing environment 24 may disperse the cybersecurity sensor configuration 90 to any cybersecurity agents 36 deployed in the field. A cybersecurity network administrator, for example, may associate the cybersecurity sensor configuration 90 to the IP addresses of client devices 30 affiliated with a company/corporate network. The cybersecurity network administrator may thus download and deploy the cybersecurity sensor configuration 90 to protect the client devices 30 from the cyberattack or threat 34 specified by the cybersecurity event request 28.

FIGS. 5-6 illustrate examples of improved computer functioning. Because the graphical user interface 42 is designed for very easy use (perhaps even by laypersons largely unfamiliar with cybersecurity), the user's inputs 40 are simple and lack detail. If, however, the user's inputs 40 contain perhaps even a small error, the cybersecurity agent 36 could be mis-configured and cause an operational error in the client device 30. Any operational error in the client device 30 could have significant repercussions. Suppose, for example, that the client device 30 is a heart, lung, patient, or other computerized medical monitor 110. The cybersecurity agent 36 is installed to the medical monitor 110 and protects the medical monitor 110 from computer viruses, hacks, and other cyberattacks or threats 34. If, however, the user's inputs 40 contain even a small error, the cybersecurity agent 36 may be mis-configured and fail to detect a particular cyberattack or threat 34. Even worse, the mis-configured cybersecurity agent 36 could cause the medical monitor 110 to crash or fail. The cybersecurity event validation service 20, instead, improves the functioning of the client device 30 by ensuring the cybersecurity event request 28 is correctly defined and validated, thus further ensuring that the cybersecurity agent 36 is correctly configured.

The cybersecurity event validation service 20 may also improve the functioning of the cloud server 26. The cybersecurity event validation software application 84 instructs or causes the cloud server 26 to validate the cybersecurity event request 28. If the cybersecurity event request 28 satisfies or passes cybersecurity event validation service 20, then the cloud server 26 may generate the cybersecurity event software package 102 representing the cybersecurity event request 28. The cybersecurity event validation software application 84, for example, may translate the cybersecurity event request 28 into software programming statements, instructions, and other code to be executed by the cybersecurity agent 36. The cybersecurity event validation service 20 thus prevents or stops the cloud server 26 from wasting hardware and software resources on mis-defined user inputs 40. That is, if the user's inputs 40 are incorrect, the cloud server 26 would consume precious processor and memory cycles that generate an incorrect or invalid sensor configuration 90. The cloud server 26 has wasted time, resources, networking communications, and electrical power generating an incorrect cybersecurity event software package 102. The cybersecurity event validation service 20, instead, pre-validates the cybersecurity event request 28 to improve the functioning of the cloud server 26.

FIG. 6 also illustrates improves computer functioning. Here the client device 30 is illustrated as a banking/financial server 112. The banking/financial server 112 processes financial transactions, stock trades, bank transfers, credit card purchases, or any other good/service/money exchange. The cybersecurity agent 36 is installed to the banking/financial server 112 and protects the banking/financial server 112 from computer viruses, hacks, and other cyberattacks or threats 34. If, however, the user's inputs 40 contain perhaps even a small error, the cybersecurity agent 36 may be mis-configured and fail to detect a particular cyberattack or threat 34. Even worse, the mis-configured cybersecurity agent 36 could cause the banking/financial server 112 to crash or fail, thus perhaps jeopardizing financial records and results. The cybersecurity event validation service 20, instead, improves the functioning of the client device 30 by ensuring the cybersecurity event request 28 is correctly defined and validated, thus further ensuring that the cybersecurity agent 36 is correctly configured. The cybersecurity event validation service 20 also improves the functioning of the cloud server 26 by pre-validating the cybersecurity event request 28.

FIGS. 7-8 illustrate some examples of a cybersecurity event ontology 120. As the cloud server 26 provides at least a portion of the cybersecurity event validation service 20, the cloud server 26 may consult the cybersecurity event ontology 120. The cybersecurity event ontology 120 is a network resource that provides and specifies definitions, data requirements, instructions, and terms associated with the cybersecurity agent 36 and with the cybersecurity event validation service 20. While the cybersecurity event ontology 120 may have any structure and network location, a relational database is perhaps easiest to illustrate and easiest to understand. FIG. 7 thus illustrates the cybersecurity event ontology 120 as an electronic database 122. The cybersecurity event ontology 120 may thus have row and columnar entries that map, relate, or otherwise associate different parameters of the associated with the cybersecurity agent 36 and with the cybersecurity event validation service 20 to their corresponding entries. While the cybersecurity event ontology 120 may have any remote networked location, FIG. 7, for simplicity, illustrates the cybersecurity event ontology 120 locally stored in the memory device 86 of the cloud server 26. As one example, the cybersecurity event ontology 120 may have entries that associate the different cybersecurity event templates 50 to their corresponding data fields associated with the graphical user interface 42 (as illustrated with reference to FIG. 2). The cybersecurity event ontology 120 may thus specify or define requirements (e.g., permissible/impermissible text characters, minimum/maximum text length, valid/invalid inputs 40, minimum/maximum bit/byte sizes/values, permissible/impermissible geographic locations, and/or permissible/impermissible machine/processor/memory requirements). The cybersecurity event ontology 120 thus specifies any requirements governing the cybersecurity event template 50, the cybersecurity event instance 54, the data label 56, the cybersecurity event disposition 58, and/or the cybersecurity event condition 60. The cybersecurity event ontology 120 may further have database entries that associate the cybersecurity event template 50, the cybersecurity event instance 54, the data label 56, the cybersecurity event disposition 58, and/or the cybersecurity event condition 60 to the sensor configuration 90, the cybersecurity event interference 92, the cybersecurity event context 94, the cybersecurity agent configuration parameters 97, and/or the common types 98 of data. The cybersecurity event validation software application 84 may thus instruct the hardware processor 88 to perform a database lookup and to identify the requirements for any parameter associated with the cybersecurity event request 28, with the cybersecurity agent 36, and/or with the cybersecurity event validation service 20. The cybersecurity event validation service 20 may simply compare the cybersecurity event request 28 to the entries described by the cybersecurity event ontology 120. The cloud server 26 may thus identify and/or retrieve any corresponding database entries. The cloud server 26 may also compare the cybersecurity event request 28 to the database entries associated with the cybersecurity event ontology 120. If any information associated with the cybersecurity event request 28 conforms to their corresponding entry/entries, then perhaps the cybersecurity event validation service 20 validates the cybersecurity event request 28. If, however, any information associated with the cybersecurity event request 28 fails to conform (or non-conforming) to their corresponding entry/entries, then perhaps the cybersecurity event validation service 20 invalidates/rejects the cybersecurity event request 28 and generates an error.

As FIG. 8 illustrates, the cybersecurity event ontology 120 may also provide event details. The cybersecurity event validation service 20 may use the cybersecurity event ontology 120 to augment the cybersecurity event request 28 with additional informational content. Again, because the cybersecurity event request 28 may describe only very simple descriptions of the user's targeted cyberattack or threat 34, the cybersecurity event request 28 lacks details that are needed to correctly configured the cybersecurity agent 36. The cybersecurity event validation service 20, however, may use the cybersecurity event ontology 120 to elegantly enrich the cybersecurity event request 28. The cybersecurity event validation software application 84, for example, may read/inspect the cybersecurity event request 28, query the cybersecurity event ontology 120, and generate the cybersecurity event inferences 92. By identifying and/or retrieving the entries described by the cybersecurity event ontology 120, the cybersecurity event validation service 20 may infer additional details and parameters associated with the cybersecurity event request 28. The cybersecurity event validation service 20, for example, may infer the cybersecurity event context 94 associated with the cybersecurity event request 28. The cybersecurity event context 94 describes the event circumstances associated with the cybersecurity event request 28, such as hardware, software, and/or operating system 82 events, behaviors, and/or activities associated with the user's inputs 40. Moreover, the cybersecurity event validation service 20 may additionally or alternatively query the cybersecurity event ontology 120 for the cybersecurity event template 50 and/or the cybersecurity event instance 54 and identify and/or infer additional, related entries, details, and parameters. The cybersecurity event validation service 20 may additionally or alternatively query the cybersecurity event ontology 120 for the data label 56, the cybersecurity event disposition 58, and/or the cybersecurity event condition 60. The cloud server 26 performs a database lookup for any entries associated with any query parameter, thus allowing the cybersecurity event validation service 20 to identify any related entries and to infer additional information related to the cybersecurity event request 28. Moreover, because the cybersecurity event ontology 120 may contain specifications and requirements, the cybersecurity event validation service 20 may compare the cybersecurity event request 28 to any ontological rules/requirements specified by the cybersecurity event ontology 120. The cybersecurity event validation service 20 may thus use the cybersecurity event ontology 120 to identify formatting, configuration, and other errors in the cybersecurity event request 28. The cybersecurity event validation service 20 may also use the cybersecurity event ontology 120 to infer the additional cybersecurity agent configuration parameters 97 and/or the common types 98 of data. So, even though the graphical user interface 42 may not require the user to input full event details, the cybersecurity event ontology 120 may be used to check the user's inputs 40 and to infer missing details.

FIGS. 9-15 illustrate more examples of the cybersecurity event validation service 20. The cybersecurity event validation software application 84 examines the cybersecurity event request 28 and determines the cybersecurity event context 94 based on the cybersecurity event ontology 120 and the user's inputs 40 (e.g., the cybersecurity event template 50, the cybersecurity event instance 54, the data label 56, the cybersecurity event disposition 58, and/or the cybersecurity event condition 60). The cybersecurity event validation software application 84 may generate the cybersecurity event inferences 92 and the cybersecurity event context 94. The cybersecurity event validation software application 84 may deduce the cybersecurity event inferences 92 by using any one or more of the user's inputs 40 (represented by the cybersecurity event request 28), the cybersecurity event ontology 120, and/or the Hindley-Milner type system 130 for lambda calculus 132 with a polymorphism 134. The cybersecurity event validation service 20 may thus use the Hindley-Milner type system 130 to infer the additional cybersecurity agent configuration parameters 97 and/or the common types 98 of data.

The Hindley-Milner type system 130, often associated with functional programming languages like Haskell, may seem distant from the realm of language validation and translation associated with the graphical user interface 42. However, its application by the cybersecurity event validation service 20 can offer significant benefits in terms of code correctness, maintainability, and ease of translation management. The cybersecurity event validation service 20 may generate a Hindley-Milner type inference 136 that can be harnessed to enhance the process of user interface (or UI) language validation and translation. The Hindley-Milner type inference 136 is a type system used in functional programming languages to automatically infer the types of expressions within a program. This helps in catching type-related errors at compile-time, ensuring code reliability.

The cybersecurity event validation service 20 may thus elegantly use the Hindley-Milner type inference 136. The Hindley-Milner type inference 136, for example, enforces strong typing, ensuring that data types are consistent throughout a codebase. This may be crucial for UI language validation, as it helps prevent mixing incompatible data types. The Hindley-Milner type inference 136 also reduces error. By catching type errors at compile-time, the Hindley-Milner type inference 136 reduces the chances of runtime errors, which can lead to glitches and crashes. The Hindley-Milner type inference 136 also clarifies programming code. With type annotations, code becomes easier for developers to understand and maintain, which is essential for UI translation efforts. The Hindley-Milner type inference 136 also easy to implement, as the Hindley-Milner type inference 136 can quickly identify areas that need adjustment due to type changes.

The cybersecurity event validation service 20 may thus apply the Hindley-Milner type inference 136 in UI Language Validation. The Hindley-Milner type inference 136 can be used to ensure that text and data types are correctly matched. For instance, consider a scenario where a graphical button control component displays the cybersecurity data label 56 (as illustrated by FIG. 2). With the Hindley-Milner type inference 136, one can enforce that the label's type matches the expected string type for UI text. Any mismatches will be caught during compilation, preventing potential issues with misaligned data types.

The cybersecurity event validation service 20 may thus generate the cybersecurity event inference 92. The cybersecurity event inference 92 may thus utilize Hindley-Milner type system 130 in maintaining type safety, correctness, and expressiveness in the UI language validation and translation pipeline. It allows for the automatic detection of type-related issues, ensuring that the cybersecurity event request 28 is well-formed and semantically accurate before execution or translation.

Figure 10:
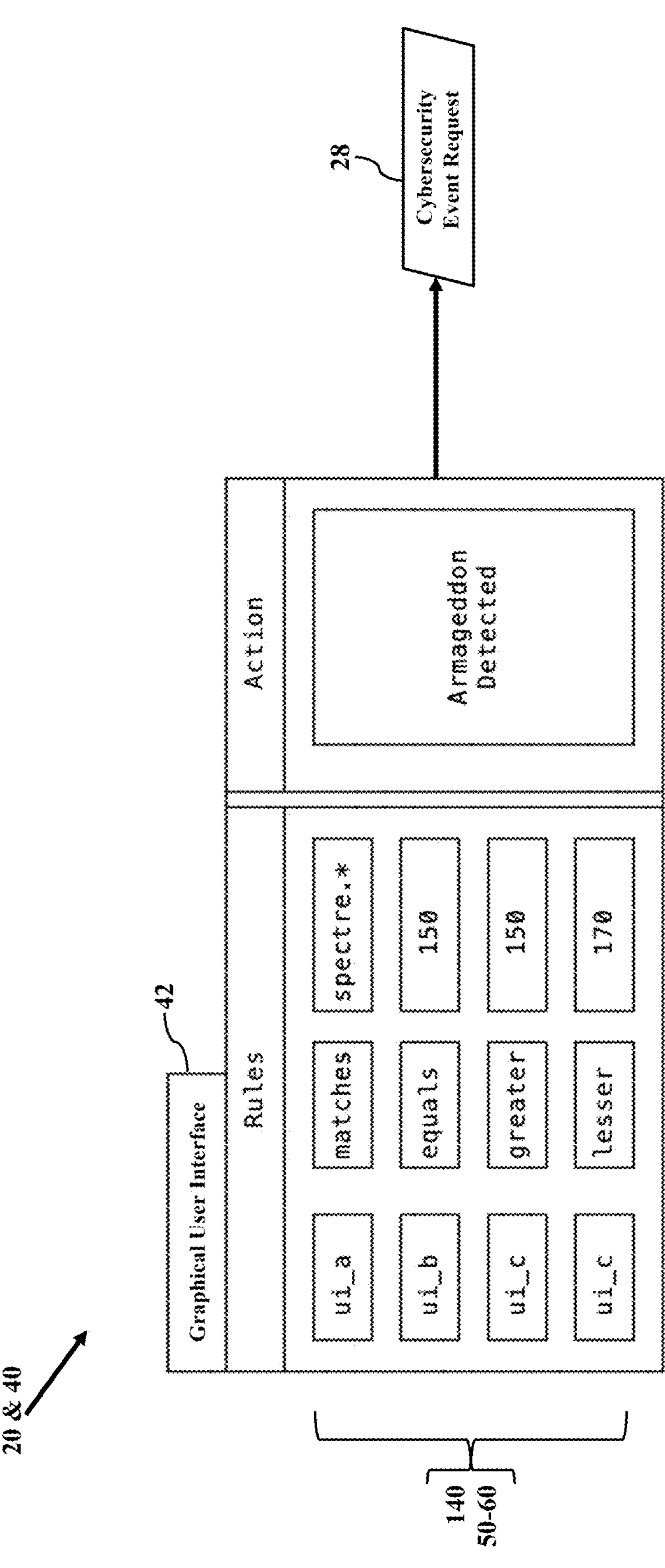

FIG. 10 illustrates some examples of the user's inputs 40. The cybersecurity agent 36 has programming that instructs the client device 30 (illustrated, respectively, in FIGS. 1 & 3-9) to generate and to display the graphical user interface 42. The user 38 (illustrated in FIGS. 1 & 3) then tactilely interfaces with the GUI 42 and types/enters the inputs 40. FIG. 10, for example, illustrates examples of regular expressions 140 and their corresponding rules entered within the GUI 42. Each regular expression 140 may describe a corresponding cybersecurity event template 50, cybersecurity event instance 54, the cybersecurity event condition 60, the cyberattack or threat 34, and/or the cybersecurity event disposition 58. The user's interactions are thus driven and captured via the GUI 42 by the cybersecurity agent 36. The user 38 (such as a cybersecurity analyst) expresses condition rules under which the cybersecurity event condition 60 can trigger a detection. The cybersecurity agent 36 then generates and sends the cybersecurity event request 28 to the cloud computing environment 24 (as earlier explained), and the cybersecurity event request 28 represents the user's inputs 40.

As FIGS. 11-12 illustrate, the cybersecurity event validation service 20 may transform the cybersecurity event request 28. The cloud computing environment 24 forwards the cybersecurity event request 28 to the cloud server 26 (as earlier explained with reference to FIGS. 1 & 3). When the cloud server 26 receives the cybersecurity event request 28, the cybersecurity event validation software application 84 may instruct the cloud server 26 to parse the regular expression 140 and to generate an Abstract Syntax Tree (or AST). In perhaps an initial step, FIG. 11 illustrates a JavaScript Object Notation (or JSON) representation 142. The cybersecurity event validation service 20 may transform the cybersecurity event request 28 into the JSON representation 142 (such as a JSON-formatted backend request). This JSON representation 142 serves as an intermediate format for further processing. Notably, this step need not include any type annotations; it focuses on capturing the raw structure of the cybersecurity event request 28. As FIG. 12 illustrates, type inferencing may begin with parsing the JSON representation 142 into a lambda calculus expression 144, typically represented as an abstract syntax tree (AST). In the context of UI language validation and translation, this AST includes lambda abstractions, function applications, variables, and Algebraic Data Type (ADT) constructors, reflecting the structure of the cybersecurity event request 28 (e.g., the lambda calculus expression 144).

The cybersecurity event validation service 20 may annotate. Type inference introduces type variables for parts of the AST that have unspecified types. Type variables are placeholders that represent unknown types and are often denoted as lowercase letters (e.g., 'a', 'b'). Type annotations, if available, provide explicit type information for specific expressions, aiding the inference process.

The cybersecurity event validation service 20 may determine constraints. As the type inference process traverses the AST, it collects constraints on types. Constraints are generated based on the relationships between expressions. For example, in a function application, the types of the function and argument must align.

The cybersecurity event validation service 20 may unify. The heart of Hindley-Milner type inference 136 is unification. Unification is the process of resolving type variables by finding the most general type that satisfies all constraints. For instance, if the regular expression 'x' has an unknown type 'a' and 'y' with an unknown type 'b', and 'x' is assigned the type 'a→b', unification will determine that both 'x' and 'y' should have the type 'a→b'.

As FIG. 13 illustrates, the cybersecurity event validation service 20 may perform the operations of constraint collection and unification. The cybersecurity event validation software application 84 (illustrated in FIGS. 3-9), for example, may have modules or portions or calls that recursively traverse the AST, propagating constraints and performing unification until a consistent set of types is determined for all expressions, as below explained.

Constraints on ontological types are collected. These constraints represent the relationships and dependencies between different data types, allowing the cybersecurity agent 36, the cloud computing environment 22, and/or the cloud server 26 to understand how data should flow within the GUI 42.

These constraints are resolved to prove the validity of the original cybersecurity event request 28. The Hindley-Milner type inference 136 ensures that the types within the lambda calculus expression 144 align correctly, guaranteeing that the cybersecurity event request 28 is well-formed and adheres to the expected data structures.

Using the lambda calculus 132 for this purpose enables the expression of the cybersecurity event request 28 as generic computations, allowing for flexibility and reusability in handling various UI scenarios.

As FIGS. 14-15 illustrate, the cybersecurity event validation service 20 may check ontological types. The cybersecurity event validation software application 84 (illustrated in FIGS. 3-9) may execute additional operations that confirm or validate ontological types. These checks ensure that the types align with the expected domain-specific semantics. Mapping the cybersecurity event labels 56 to the cybersecurity event instances 54 (e.g., sensor events) and the event definitions are provisioned from the cybersecurity event ontology 120.

The resulting annotated AST is then used for further processing or translation. The presence of type annotations ensures that the generated code is type-safe, reducing the likelihood of runtime errors related to type mismatches.

The cybersecurity event validation service 20 may then compile and generate sensory code. Once the lambda calculus expression 144 is validated and enriched with type annotations, the next step involves translating the elaborated request into low-level instructions. This translation is achieved through evaluation by normalization. In this step, the annotated types guide the transformation process, ensuring that the translation accurately represents the intended UI behavior. The cybersecurity event validation service 20 thus performs operations for generating the sensor configuration 90. The cybersecurity event validation software application 84, in other words, may translate the elaborated request into software programming statements, instructions, and other code to be executed by the cybersecurity agent 36. This sensor configuration 90 thus detects the regular expression 140 specified by the cybersecurity event request 28. The cybersecurity event validation software application 84 thus instructs the cloud server 26 to generate the cybersecurity event software package 102 representing the cybersecurity event request 28. The cybersecurity event validation service 20 may then download or send the cybersecurity event software package 102 to the network address (e.g., IP address) associated with the client device 30 and/or with the cybersecurity agent 36. When the client device 30 receives the cybersecurity event software package 102, the cybersecurity agent 36 cooperates with the client device 30 to store and to install the cybersecurity event software package 102 (as illustrated with reference to FIG. 6). The client device 30 is thus ready to detect the cyberattack or threat 34 represented by the cybersecurity event request 28.

Figure 16:
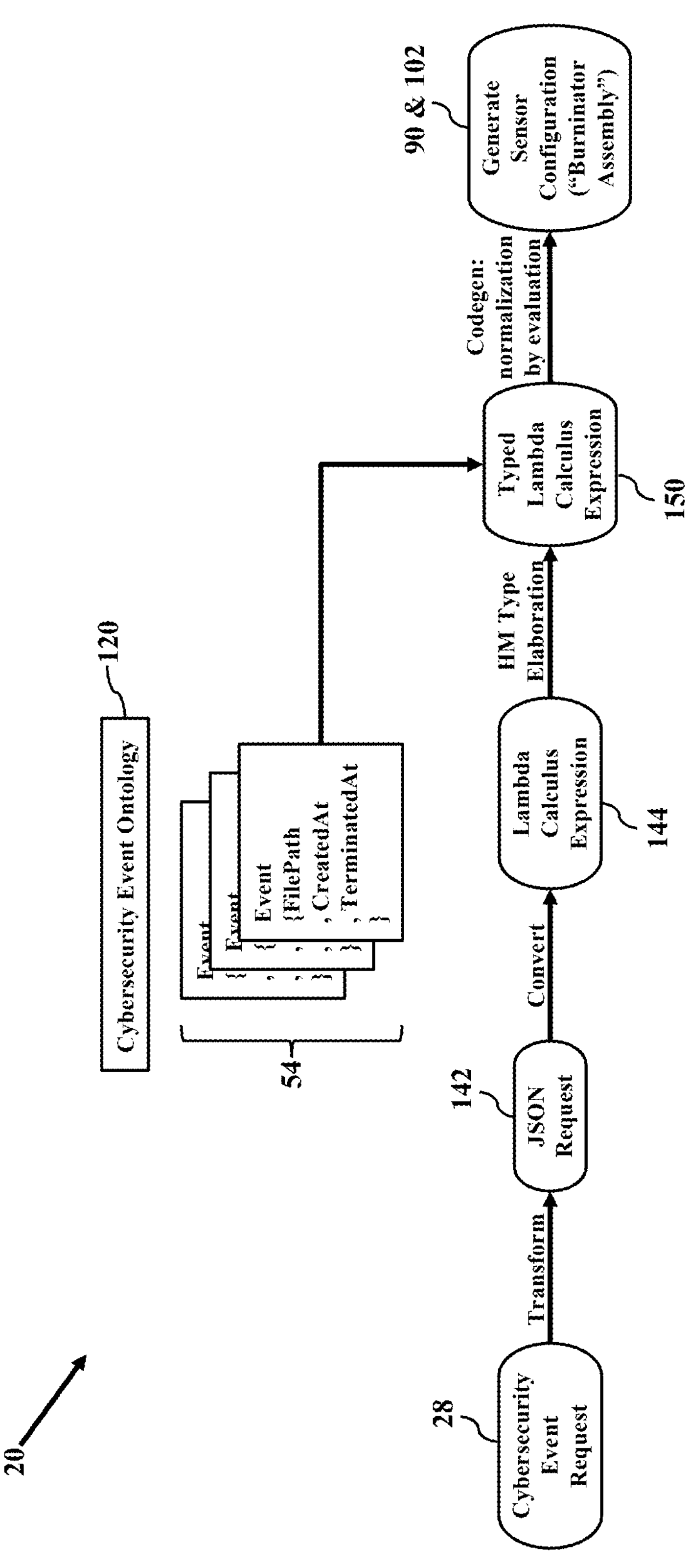
FIG. 16 illustrates still more examples of the cybersecurity event validation service.

FIG. 16 illustrates still more examples of the cybersecurity event validation service 20. The cybersecurity event validation service 20 generates the cybersecurity event request 28 based on the user's inputs 40 to the graphical user interface 42 (generated by the cybersecurity agent 36, as explained with reference to FIGS. 1-3). The cybersecurity event validation service 20 may transform the cybersecurity event request 28 into the JSON representation 142 as an intermediate format for further processing. The cybersecurity event validation service 20 may parse and convert the JSON representation 142 into the lambda calculus expression 144 that further represents the cybersecurity event request 28. The Hindley-Milner type inference 136 may be used to augment or elaborate details or parameters associated with the lambda calculus expression 144, thus generating the typed lambda calculus expression 150, perhaps using the cybersecurity event ontology 120 and the user's inputs 40 (such as the regular expression 140) as the cybersecurity event context 94. The cybersecurity event validation service 20 may then generate the cybersecurity event software package 102 (representing the sensor configuration 90) using normalization and evaluation.

The cybersecurity event validation service 20 thus provides further improved computer functioning. To ensure conformity with the cybersecurity event ontology 120 and compatibility with a runtime environment associated with the cybersecurity agent 36, the cybersecurity event validation service 20 implements an enhanced version of the Hindley-Milner type system 130 (e.g., a Hindley-Milner type unification). The cybersecurity event validation service 20 thus provides type inferencing by examining the user's inputs 40 (represented by the cybersecurity event request 28) and, by utilizing the cybersecurity event ontology 120 as the cybersecurity event context 94 and the cybersecurity event condition 60 (e.g., the logical operator 62) performed on them to deduce their types. Additionally, it translates ontology input events and output dispositions into a standardized record-like type representation. This representation is then incorporated to harmonize and match the inferred types, ensuring their consistency and compatibility. The cybersecurity event validation service 20 also provides type compatibility by guaranteeing that the types involved in condition operations or output dispositions are compatible, thus preventing type errors during compilation or runtime in the cybersecurity agent 36. The cybersecurity event validation service 20 also provides the polymorphism 134 by generating meta type variables that are subsequently unified with concrete ontological types, thus again enabling the user's inputs 40 (represented by the cybersecurity event request 28) to be formulated in a generic manner. For instance, cybersecurity event validation service 20 allows seamless set operations on lists of pattern IDs, tag collections, and bit field sets. The cybersecurity event validation service 20 also facilitates error detection and reporting during the compilation process. That is, failed unification attempts indicate type inconsistencies, which are then reported via the graphical user interface 42 to the user 38. This proactive approach is invaluable in identifying and rectifying numerous bugs at an early stage of development and training. The cybersecurity agent 36 is custom tailored to detect very specific cyberattack or threat 34 using very simple user inputs 40.

The cybersecurity event validation service 20 thus allows the user 38 to configure the cybersecurity agent 36. The user 38 may interface with the cybersecurity agent 36 via the graphical user interface 42 and input selections/data (such as the regular expression 140) specifying the targeted cyberattack or threat 34. The cybersecurity agent 36 uploads the user's inputs 40 to the cloud-based cybersecurity event validation service 20 for inference augmenting, enrichment, and validation. The user's inputs 40 may thus be very simple for ease of use, and the cybersecurity event validation service 20 determines the fine details. As long as the user's inputs 40 satisfy the cybersecurity event ontology 120, the cybersecurity event validation service 20 handles the sensor configuration 90 required by the cybersecurity agent 36. The user 38 thus need not be versed in the intricate programming/configurational details needed by the cybersecurity agent 36. The user 38 only needs a basic or even a beginner/rudimentary knowledge of cybersecurity techniques.

FIG. 17 illustrates examples of local execution. Even though the cybersecurity agent 36 may communicate with the cloud computing environment 24, the cybersecurity agent 36 may have access to adequate hardware and software resources to provide most, or perhaps even all, of the cybersecurity event validation service 20. The cybersecurity event validation software application 84, for example, may be downloaded to the client device 30 (such as via the access network 70 to the cloud computing environment 24 to the cloud server 26, as illustrated by FIG. 1). Again, while the client device 30 may be any processor-controlled device, FIG. 17 again illustrates the laptop computer 32. The laptop computer 32 has a hardware processor that executes the operating system 106 stored in a memory device. The hardware processor also executes the cybersecurity event validation software application 84 stored in the memory device. The cybersecurity event validation software application 84 may thus be an additional software module, component, or service to the cybersecurity agent 36. The cybersecurity agent 36 may thus cooperate with the client device 30 (such as via the operating system 106) to store and execute the cybersecurity event validation software application 84 as a local enhancement. The cybersecurity agent 36 and/or the cybersecurity event validation software application 84 may thus cause or instruct the client device 30 to perform operations, such as locally providing the cybersecurity event validation service 20. The cybersecurity agent 36 and the cybersecurity event validation software application 84 may thus cooperate to cause or instruct the client device 30 to generate and display the graphical user interface 42 via a display device. The cybersecurity agent 36 and/or the cybersecurity event validation software application 84 accept/receive the user's inputs 40 and generate the cybersecurity event request 28. The user's inputs 40 describe or specify the targeted cyberattack or threat 34 (such as by specifying the very simple regular expression 140). The client device 30, locally executing the cybersecurity agent 36 enhanced with the cybersecurity event validation software application 84, may transform the cybersecurity event request 28 into the JSON representation 142. The cybersecurity agent 36 and/or the cybersecurity event validation software application 84 may cause or instruct the client device 30 to parse and to convert the JSON representation 142 into the lambda calculus expression 144. The cybersecurity agent 36 and/or the cybersecurity event validation software application 84 may cause or instruct the client device 30 to apply the Hindley-Milner type inference 136 to augment or elaborate additional details or parameters associated with the lambda calculus expression 144, thus generating the typed lambda calculus expression 150, perhaps using local or cloud access to the cybersecurity event ontology 120 as the cybersecurity event context 94. The cybersecurity agent 36 and/or the cybersecurity event validation software application 84 may cause or instruct the client device 30 to generate the cybersecurity event software package 102 (representing the sensor configuration 90) using normalization and evaluation. The cybersecurity agent 36 and/or the cybersecurity event validation software application 84 may further cooperate with the operating system 106 to locally store and execute the cybersecurity event software package 102, thus further configuring the cybersecurity agent 36 to detect the cyberattack or threat 34 represented by the user's very simple inputs 40. The cybersecurity event validation service 20 may thus be entirely or mostly a local solution, perhaps only needing network cloud access to the remotely/cloud-stored cybersecurity event ontology 120. Again, though, cybersecurity event ontology 120 may be a locally-stored resource, given adequate hardware, software, and/or network resources.

The cybersecurity event validation service 20 thus enhances detection and assessment of malicious computer activities, behaviors, and usage. The user 38 may simply and quickly configure the cybersecurity agent 36 using very simple inputs 40 to the graphical user interface 42. The cybersecurity event validation service 20 validates the very simple inputs 40, perhaps ensuring the inputs 40 at least minimally conform to the cybersecurity event ontology 120. The cybersecurity event validation service 20 also uses elegant techniques to infer very specific configuration details unspecified by the very simple inputs 40. So, even though the cybersecurity event validation service 20 only requires the very basic and simple user's inputs 40, the cybersecurity event validation service 20 infers deep, technical configuration details required by the cybersecurity agent 36.

The cybersecurity agent 36 thus detects the cyberattack or threat 34 represented by the user's very basic and simple inputs 40. When the cybersecurity agent 36 detects the user's targeted cyberattack or threat 34, the cybersecurity agent 36 reports the cyberattack or threat 34 to the cloud computing environment 24. The cybersecurity agent 36 is thus downloaded to smartphones, computers, servers, and other endpoint client devices 30. The cybersecurity agent 36 monitors its endpoint client device 30 for viruses, hacks, suspicious usage, malicious software (or malware), and other cyberattack or threat 34 (such as those represented by the user's very basic and simple inputs 40). Should the cybersecurity agent 36 detect suspicious behavior, identity, location, or other data, the cybersecurity agent 36 may implement immediate action (such as the disposition 58 represented by the user's inputs 40). The cybersecurity agent 36 may also send a cyber security detection to the cloud computing environment 24, thus alerting the cloud computing environment 24 to the cyberattack or threat 34 that corresponds to the user's inputs 40. The cloud computing environment 24 may further assess the cyberattack or threat 34, such as comparing the cyberattack or threat 34 to a cyber security profile generated by a machine learning model. The cyber security profile historically and statistically reflects thousands or even millions of cyber security incidents and/or assessments conducted by human experts and/or machine analysis. The cyber security profile may describe normal or harmless behaviors, identities, locations, or other data. The cyber security profile, however, may additionally or alternatively describe abnormal or unexpected behaviors, identities, locations, or other data. So, by comparing the cyber security detection to the cyber security profile, the cloud computing environment 24 provides a cloud-based cybersecurity detection prediction service that quickly and accurately predicts whether any cyber security detection is truly malicious (a true positive report) or is harmless activity (a false positive report). The cybersecurity event validation service 20 thus provides much faster and simpler cybersecurity agency configuration to detect the ever-increasing viruses, malware, and other cyberattack or threat 34.

The cybersecurity agent 36 may thus cooperate with the cloud computing environment 24 to provide a nimble and effective endpoint detection and response solution. The cybersecurity agent 36 may be an endpoint, antimalware driver functioning as an endpoint detection and response tool that blocks any cybersecurity attack. The cybersecurity agent 36 may be downloaded and installed to the client device 30. The cybersecurity agent 36 continuously monitors the client device 30 to detect and to respond to any cybersecurity attack. The cybersecurity agent 36 thus provides a cyber security service, perhaps as a local endpoint detection and response (EDR) solution.

The cybersecurity agent 36 may also integrate with an XDR solution. Extended detection and response (XDR) collects threat data from siloed security tools across an organization's technology stack. The cybersecurity agent 36, when online, may upload security telemetry data from the host client device 30 to the cloud computing environment 24. Any data uploaded from the cybersecurity agent 36 may then be unified/merged with other data collected from other platforms, perhaps filtered and condensed into a single console.

The user 38 may thus configure the cybersecurity agent 36 to detect the cyberattack or threat 34. The user's inputs 40, however, may only very simply or broadly describe the cyberattack or threat 34. The user's inputs 40 lack specific details that are required to accurately configure the cybersecurity agent 36. The cybersecurity event validation service 20, instead, infers missing or required details not specified by the cybersecurity event request 28. Inferencing keeps the graphical user interface 42 as user-friendly as possible while still providing an accurate sensor configuration 90. The cybersecurity agent 36 thus provides very accurate cybersecurity detection with minimal inputs 40 from the user 38.

Figure 18:
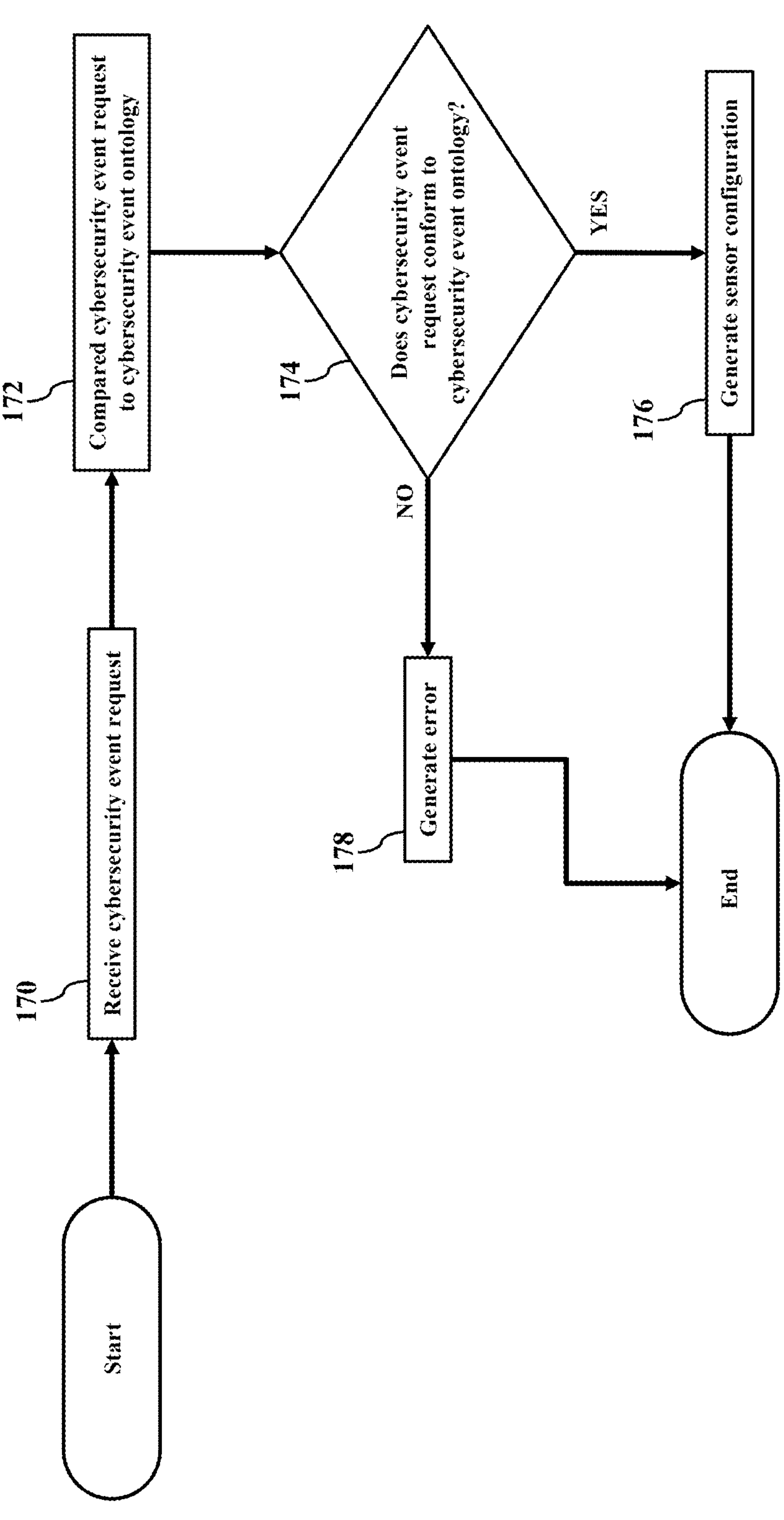
FIG. 18 illustrates examples of a method or operations that generates/generate a cybersecurity sensor configuration for configuring a cybersecurity agent to detect a cyberattack.

FIG. 18 illustrates examples of a method or operations that generates/generate the cybersecurity sensor configuration 90 for configuring the cybersecurity agent 36 to detect the cyberattack or threat 34. The cybersecurity event request 28 representing the cyberattack or threat 34 to be detected by the cybersecurity agent 36 is received (Block 170). The cybersecurity event request 28 is compared to the cybersecurity event ontology 120 defining parameters for detecting the cyberattack or threat 34 (Block 172). If the cybersecurity event request 28 conforms to the cybersecurity event ontology 120 defining the parameters for detecting the cyberattack or threat 34 (Block 174), then the cybersecurity sensor configuration 90 is generated that configures the cybersecurity agent 36 to detect the cyberattack or threat 34 (Block 176). If, however, the cybersecurity event request 28 does not conform to the cybersecurity event ontology 120 (Block 174), then an error is generated (Block 178). The user may be given an opportunity to correct mistakes and to resubmit another, corrected cybersecurity event request 28.

Figure 19:
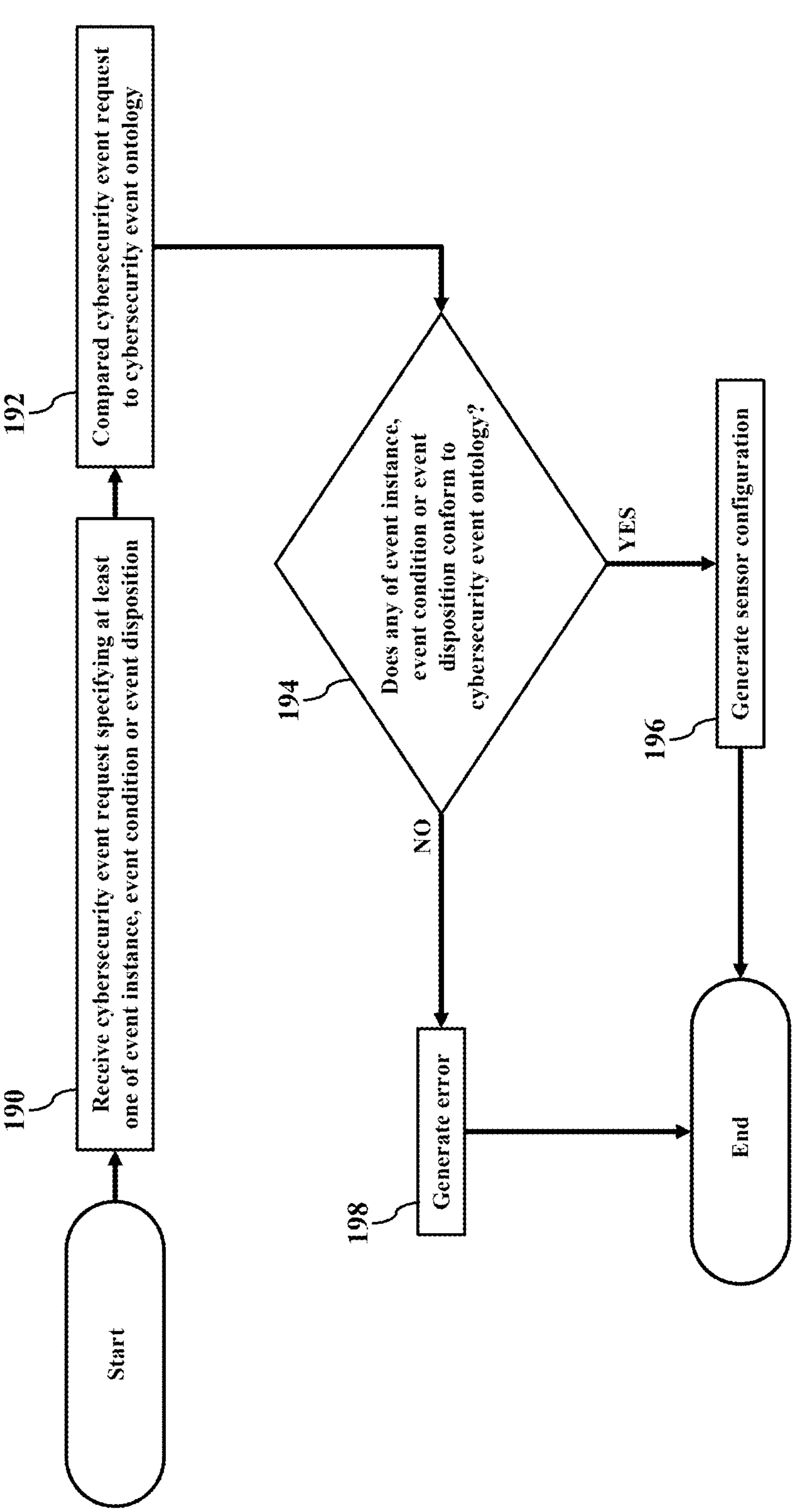
FIG. 19 illustrates more examples of a method or operations that generates/generate the cybersecurity sensor configuration.

FIG. 19 illustrates more examples of a method or operations that generates the cybersecurity sensor configuration 90. The cybersecurity event request 28 is received, and the cybersecurity event request 28 specifies at least one of an event instance 54, an event condition 60, or an event disposition 58 (Block 190). The at least one of the event instance 54, the event condition 60, or the event disposition 58 is compared to the cybersecurity event ontology 120 ((Block 192). If any of the event instance 54, the event condition 60, or the event disposition 58 conforms to the cybersecurity event ontology 120 (Block 194), then the cybersecurity sensor configuration 90 is generated (Block 196). If, however, any of the event instance 54, the event condition 60, or the event disposition 58 does not conform to the cybersecurity event ontology 120 (Block 194), then an error is generated (Block 198). The user may be given an opportunity to correct mistakes and to resubmit another, corrected cybersecurity event request 28.

Figure 20:
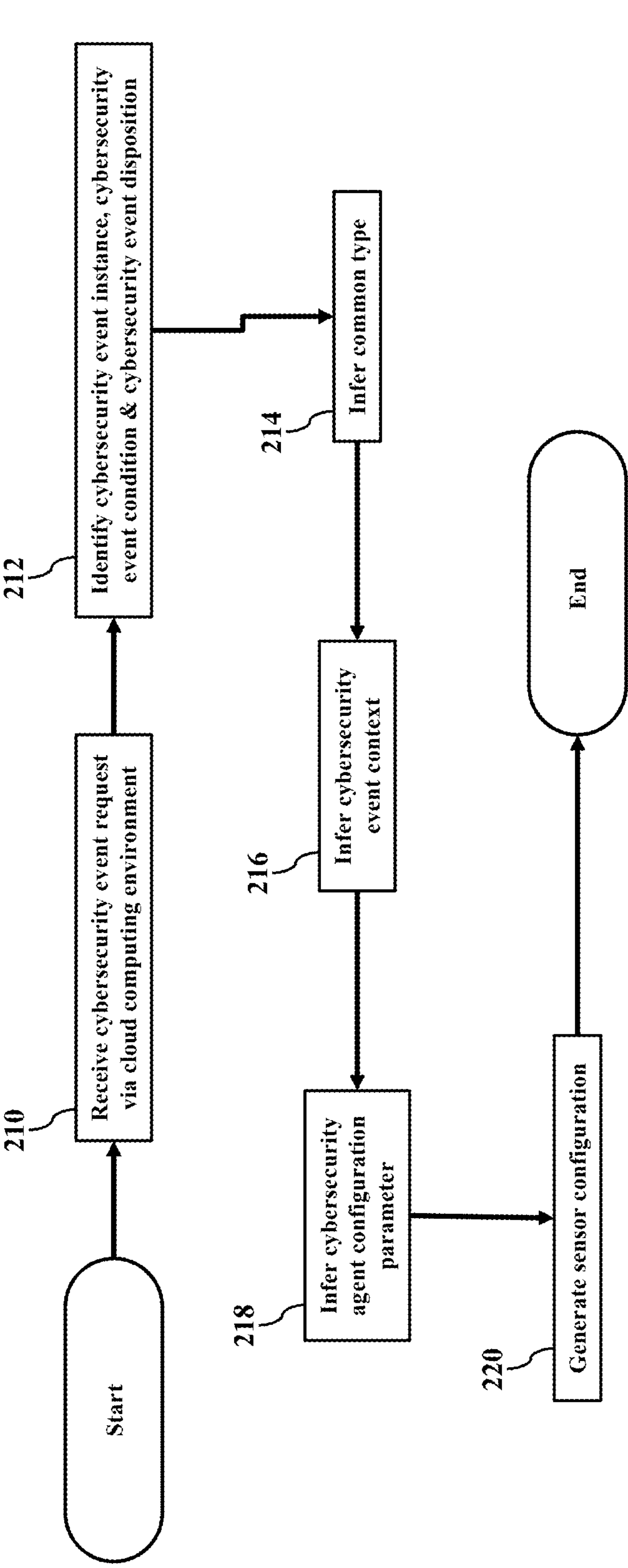
FIG. 20 illustrates still more examples of a method or operations that generates/generate the cybersecurity sensor configuration.

FIG. 20 illustrates still more examples of a method or operations that generates the cybersecurity sensor configuration 90. The cybersecurity event request 28, sent via the cloud computing environment 22, is received (Block 210). The cybersecurity event instance 54, the cybersecurity event condition 60, and the cybersecurity event disposition 58 are identified based on the cybersecurity event request 28 (Block 212). The common type 98 is inferred between any of the cybersecurity event instance 54, the cybersecurity event condition 60, and the cybersecurity event disposition 58 based on the cybersecurity event ontology 120 (Block 214). The cybersecurity event context 94 is inferred based on the cybersecurity event ontology 120 (Block 216). The cybersecurity agent configuration parameter 97, unspecified by the cybersecurity event request 28, is inferred (Block 218). The cybersecurity sensor configuration 92 is generated (Block 220).

FIG. 21 illustrates a more detailed example of the operating environment. FIG. 21 is a more detailed block diagram illustrating the computer system 22 and client device 30. The cybersecurity agent 36 and/or the cybersecurity event validation software application 84 is stored in the memory subsystem or device 86. One or more of the processors 88 communicate with the memory subsystem or device 32 and execute the cybersecurity agent 36 and/or the cybersecurity event validation software application 84. Examples of the memory subsystem or device 86 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology.

The computer system 22 and the client device 30 may have any embodiment. As this disclosure explains, the computer system 22 and the client device 30 may be embodied as any processor-controlled information handling system. The computer system 22 and the client device 30 may be embodied as a server, a switch, a router, a storage component, and/or a management component. The computer system 22 and the client device 30 may also be embodied as the smartphone 104, a tablet computer, a smartwatch, a television, an audio device, a remote control, and/or a recorder. The computer system 22 and the client device 30 may also be embodied as a smart appliance, such as washers, dryers, and refrigerators. Indeed, as cars, trucks, and other vehicles grow in electronic usage and in processing power, the cybersecurity agent 36 and/or the cybersecurity event validation software application 84 may be easily incorporated into any vehicular controller.

The above examples may be applied regardless of the networking environment. The cybersecurity agent 36 and/or the cybersecurity event validation software application 84 may be easily adapted to execute in stationary or mobile devices having wide-area networking (e.g., 4G/LTE/5G cellular), wireless local area networking (WI-FI®), near field, and/or BLUETOOTH® capability. The cybersecurity agent 36 and/or the cybersecurity event validation software application 84 may be applied to stationary or mobile devices utilizing any portion of the electromagnetic spectrum and any signaling standard (such as the IEEE 802 family of standards, GSM/CDMA/TDMA or any cellular standard, and/or the ISM band). The cybersecurity agent 36 and/or the cybersecurity event validation software application 84, however, may be applied to any processor-controlled device operating in the radio-frequency domain and/or the Internet Protocol (IP) domain. The examples may be applied to any processor-controlled device utilizing a distributed computing network, such as the Internet (sometimes alternatively known as the "World Wide Web"), an intranet, a local-area network (LAN), and/or a wide-area network (WAN). The examples may be applied to any processor-controlled device utilizing power line technologies, in which signals are communicated via electrical wiring. Indeed, the many examples may be applied regardless of physical componentry, physical configuration, or communications standard(s).

The computer system 22 and the client device 30 may utilize any processing component, configuration, or system. For example, the examples may be easily adapted to any desktop, mobile, or server central processing unit, graphics processor, ASIC, or chipset offered by INTEL®, ADVANCED MICRO DEVICES®, ARM®, APPLE®, TAIWAN SEMICONDUCTOR MANUFACTURING®, QUALCOMM®, or any other manufacturer. The computer system 22 and the client device 30 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The examples may inspect packetized communications. When the computer system 22 and/or the client device 30 communicates via any communications network, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The examples may utilize any signaling standard. The cloud computing environment 24, for example, may mostly use wired networks to interconnect the network members 100. However, the cloud computing environment 24 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud computing environment 24 may also utilize other standards, such as the I.E.E.E. 802 family of standards, the Industrial, Scientific, and Medical band of the electromagnetic spectrum, BLUETOOTH®, low-power or near-field, and any other standard or value.

The cybersecurity agent 36 and/or the cybersecurity event validation software application 84 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for performing the cybersecurity event validation service 20, as the above paragraphs explain.

The diagrams, schematics, illustrations, and the like represent conceptual views or processes illustrating examples of the cybersecurity event validation service 20. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system that generates a cybersecurity sensor configuration for configuring a cybersecurity agent to detect a cyber threat, comprising:

receiving, by the computer system, a cybersecurity event request sent by the cybersecurity agent monitoring a host operating system, the cybersecurity event request specifying a user's inputs to a cybersecurity event template describing the cyber threat, wherein the user's inputs comprise high-level descriptions of the cyber threat that lack configuration details required to configure the cybersecurity agent;

determining, by the computer system, that the user's inputs conform to a cybersecurity event ontology defining operating system events for detecting the cyber threat;

in response to the determining that the user's inputs conform to the cybersecurity event ontology, generating, by the computer system, the cybersecurity sensor configuration for configuring the cybersecurity agent to detect the operating system events based on the user's inputs comprising the high-level descriptions of the cyber threat; and detecting, by the computer system, the cyber threat by loading the cybersecurity sensor configuration on the cybersecurity agent monitoring the host operating system for the operating system events.

2. The method of claim 1, further comprising determining that the cybersecurity event request fails to conform to the cybersecurity event ontology.

3. The method of claim 2, wherein in response to the determining that the cybersecurity event request fails to conform to the cybersecurity event ontology, further comprising generating an error.

4. The method of claim 1, wherein the receiving of the cybersecurity event request further comprises receiving the user's inputs as a regular expression.

5. The method of claim 4, further comprising receiving the user's inputs as an operation associated with the regular expression.

6. The method of claim 1, further comprising inferring the operating system events based on the user's inputs.

7. The method of claim 1, further comprising inferring the operating system events based on the cybersecurity event ontology.

8. A computer system that generates a cybersecurity sensor configuration for configuring a cybersecurity agent to detect a cyber threat, comprising:

a central processing unit; and a memory device storing instructions that, when executed by the central processing unit, perform operations, the operations comprising:

receiving a cybersecurity event request referencing a user's input to a cybersecurity event template specifying a rule for detecting the cyber threat, wherein the user's inputs comprise high-level descriptions of the cyber threat that lack configuration details required to configure the cybersecurity agent;

determining that the user's input to the cybersecurity event template conforms to a cybersecurity event ontology having database entries that associate the cybersecurity event template to operating system events;

in response to the determining that the user's input to the cybersecurity event template conforms to the cybersecurity event ontology, generating the cybersecurity sensor configuration for configuring the cybersecurity agent to detect the operating system events; and instructing the cybersecurity agent to detect the cyber threat by installing the cybersecurity sensor configuration that monitors a host operating system for the operating system events.

9. The computer system of claim 8, wherein the operations further comprise determining that the cybersecurity event request fails to conform to the cybersecurity event ontology.

10. The computer system of claim 9, wherein the operations further comprise generating an error.

11. The computer system of claim 8, wherein the operations further comprise receiving the user's input as a regular expression.

12. The computer system of claim 8, wherein the operations further comprise receiving the user's input as an operation associated with a regular expression.

13. The computer system of claim 8, wherein the operations further comprise inferring the operating system events based on the user's input.

14. The computer system of claim 8, wherein the operations further comprise inferring the operating system events based on the cybersecurity event ontology.

15. A non-transitory computer medium memory device storing instructions that, when executed by a central processing unit, perform operations that generate a cybersecurity sensor configuration, the operations comprising:

receiving a cybersecurity event request referencing a user's input to a cybersecurity event template describing a cybersecurity threat, wherein the user's input comprises high-level descriptions of the cybersecurity threat that lack configuration details required to configure a cybersecurity agent:

determining a common type associated with the cybersecurity event request based on a cybersecurity event ontology;

determining malicious operating system events associated with the cybersecurity threat by querying the cybersecurity event ontology having a database entry that associates the user's input to the malicious operating system events associated with the cybersecurity threat;

gap filling a cybersecurity configuration parameter unspecified by the cybersecurity event request based on the malicious operating system events determined by the querying of the cybersecurity event ontology;

generating the cybersecurity sensor configuration that configures the cybersecurity agent to detect the cybersecurity threat described by the user's input by using the cybersecurity configuration parameter and the malicious operating system events; and instructing the cybersecurity agent to detect the cybersecurity threat described by the user's input by monitoring a host operating system for the malicious operating system events.

16. The non-transitory computer medium of claim 15, wherein the operations further comprise rejecting the cybersecurity event template specified by the cybersecurity event request in response to a mismatch between the cybersecurity event template and the cybersecurity event ontology.

17. The non-transitory computer medium of claim 15, wherein the operations further comprise identifying a regular expression described by the user's input to the cybersecurity event template.

18. The non-transitory computer medium of claim 15, wherein the operations further comprise determining that the cybersecurity event request fails to conform to the cybersecurity event ontology.

19. The non-transitory computer medium of claim 18, wherein the operations further comprise rejecting the cybersecurity event request.

20. The non-transitory computer medium of claim 18, wherein the operations further comprise sending the cybersecurity sensor configuration to the cybersecurity agent monitoring the host operating system.

* * * * *